United States Patent
Hebert et al.

(10) Patent No.: US 9,794,343 B2
(45) Date of Patent: *Oct. 17, 2017

(54) RECONFIGURABLE CLOUD COMPUTING

(71) Applicant: NIMBIX, Inc., Anna, TX (US)

(72) Inventors: Stephen M. Hebert, Houston, TX (US); Robert L. Sherrard, McKinney, TX (US); Leonardo E. Reiter, Allen, TX (US)

(73) Assignee: Nimbix, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/809,644

(22) Filed: Jul. 27, 2015

(65) Prior Publication Data

US 2016/0028822 A1    Jan. 28, 2016

Related U.S. Application Data

(63) Continuation of application No. 14/282,407, filed on May 20, 2014, now Pat. No. 9,094,404, which is a
(Continued)

(51) Int. Cl.
*G06F 15/177* (2006.01)
*H04L 29/08* (2006.01)
*G06F 9/50* (2006.01)

(52) U.S. Cl.
CPC ........ *H04L 67/1097* (2013.01); *G06F 9/5038* (2013.01); *G06F 9/5072* (2013.01); *H04L 67/10* (2013.01); *H04L 67/20* (2013.01)

(58) Field of Classification Search
CPC .................................................. G06F 15/177
(Continued)

(56) References Cited

U.S. PATENT DOCUMENTS 7,299,466 B2 * 11/2007 Pulsipher .............. G06F 9/4843
                                                          709/201
7,827,273 B2 * 11/2010 Wilson ................ G06F 11/3688
                                                          709/220
(Continued)

FOREIGN PATENT DOCUMENTS

EP    2 381 363 A2    10/2011    ............. G06F 9/455
EP    2 381 363 A3     3/2012    ............. G06F 9/455
(Continued)

OTHER PUBLICATIONS

Goscinski A. et al., "Toward Dynamic and Attribute Based Publication, Discovery and Selection for Cloud Computing," Future Generations Computer Systems, Elsevier Publishers, Amsterdam, NL, vol. 26, No. 7, Jul. 1, 2010, pp. 947-970.
(Continued)

*Primary Examiner* — David Lazaro
*Assistant Examiner* — Marie Georges Henry
(74) *Attorney, Agent, or Firm* — Campbell Stephenson LLP

(57) ABSTRACT

A method, system, and computer-readable storage medium for using a reconfigurable computing system are disclosed. For example, one method involves identifying a first application to be executed, configuring a computing node in a first configuration, and executing, according to a first workflow, at least a portion of a first application and at least another portion of the first application. The method also involves identifying a second application to be executed, configuring the computing node in a second configuration, and executing, according to a second workflow, at least a portion of a second application and at least another portion of the second application.

22 Claims, 18 Drawing Sheets

Related U.S. Application Data continuation of application No. 13/449,003, filed on Apr. 17, 2012, now Pat. No. 8,775,576.

(58) Field of Classification Search
USPC .............................. 709/203, 217, 220, 226
See application file for complete search history.

(56) References Cited

U.S. PATENT DOCUMENTS

| | | | | |
|---|---|---|---|---|
| 8,131,804 | B2 | 3/2012 | Greata | 709/206 |
| 9,367,395 | B1 | 6/2016 | Bono | |
| 9,411,528 | B1 | 8/2016 | McGarry et al. | G06F 3/0626 |
| 9,411,613 | B1 | 8/2016 | McGarry et al. | G06F 9/44505 |
| 9,417,894 | B1 | 8/2016 | Giganti et al. | G06F 9/44505 |
| 2003/0042930 | A1* | 3/2003 | Pileggi | H01L 27/118 326/41 |
| 2006/0036743 | A1* | 2/2006 | Deng | G06F 9/5044 709/227 |
| 2009/0319958 | A1* | 12/2009 | Li | G06F 8/30 715/866 |
| 2012/0131579 | A1 | 5/2012 | Pujolle | 718/1 |
| 2013/0097651 | A1 | 4/2013 | Rendahl | 726/1 |
| 2013/0205114 | A1 | 8/2013 | Badam | 711/207 |
| 2013/0318240 | A1 | 11/2013 | Hebert | 709/226 |
| 2014/0040883 | A1 | 2/2014 | Rompkins | 718/10 |
| 2014/0074932 | A1 | 3/2014 | Mihara | 709/204 |
| 2014/0181395 | A1 | 6/2014 | Vincent | 711/111 |
| 2015/0081764 | A1 | 3/2015 | Zhao | 709/203 |
| 2015/0096011 | A1 | 4/2015 | Watt | 726/15 |
| 2015/0213011 | A1 | 7/2015 | George | 707/802 |
| 2015/0261517 | A1 | 9/2015 | Hodge | 717/176 |
| 2016/0188877 | A1 | 6/2016 | Simha | 726/22 |
| 2016/0314025 | A1 | 10/2016 | McGarry et al. | 9/542 |

FOREIGN PATENT DOCUMENTS

| | | | | |
|---|---|---|---|---|
| JP | 3007061 A1 | 4/2016 | ............ | G06F 9/445 |
| WO | WO 2013/097902 | 7/2013 | ............ | H04W 8/26 |

OTHER PUBLICATIONS

Lazouski, A., et al., "Usage Control in Cloud Systems," Internet Technology and Secured Transactions, 2012 International Conference for Internet Technology and Secured Transactions, IEEE, Dec. 10, 2012, pp. 202-207.

Hsiliev's Blog, "Running Existing Applications on SAP HANA Cloud," retrieved from the Internet: URL:http://hsiliev.blogspot.nl/2013/06/running-existing-applications-on-sap.html (retrieved Apr. 16, 2015); Jun. 30, 2013, pp. 1-8.

Baxter, Rob. et al., "Maxwell—a 64 FPGA Supercomputer", Second NASA/ESA Conference on Adaptive Hardware and Systems (AHS), 2007, IEEE, 8 pages.

Chung, Eric S. et al., "CoRAM: An In-Fabric Memory Architecture for FPGA-based Computing", Carnegie Mellon University, 2011, 10 pages.

Convey Computer Corporation, "The Convey HC-2 TM Computer—Architectural Overview," Convey White Paper, 2011-2012, 10 pages.

George, Alan et al., "Novo-G: At the Forefront of Scalable Reconfigurable Supercomputing", Jan./Feb. 2011 issue of IEEE Magazine—Computing in Science and Engineering, 4 pages.

Putnam, Andrew et al., "A Reconfigurable Fabric for Accelerating Large-Scale Datacenter Services", Catapult ISCA 2014, Microsoft, IEEE 2014, 12 pgs.

Sato, Yukinori et al., "Evaluating Reconfigurable Dataflow Computing Using the Himeno Benchmark", IEEE 2012, 7 pages.

So, Hayden Kwok-Hay et al., "A Unified Hardware/Software Runtime Environment for FPGA-Based Reconfigurable Computers Using BORPH", Department of Electrical Engineering and Computer Science—University of California, Berkeley, Oct. 22-25, 2006; pp. 259-264.

* cited by examiner

```
{
    "inputfiles" : {
        "type" : "type_value",
        "localfiles" : [    Array of one or more data files
            "user_file_name_1",
            "user_file_name_2"
        ]
    },
    "reference-data" : "user_reference_data_value" {
        "domain-type" : "user_domain_type" This is optional
    }
    "binaries": {                              Process type, valid
    values
        "user_app_1" : "user_application",
        "user_app_2" : "user_application"
    }
    "customer": {
        "xferuser" : "your remote host user id for ftp/sftp",
        "password" : "password for xferuser",
        "user"     : "Nimbix user id",
        "nimbixpwd": "Nimbix Password",
        "email"    : "User email alerts",
        "protocol" : "ftp or sftp",
        "server"   : "your remote ftp server address"
    }
}
```

Data file(s) 352

Reference 354

Application(s) 356

Customer(s) 358

350

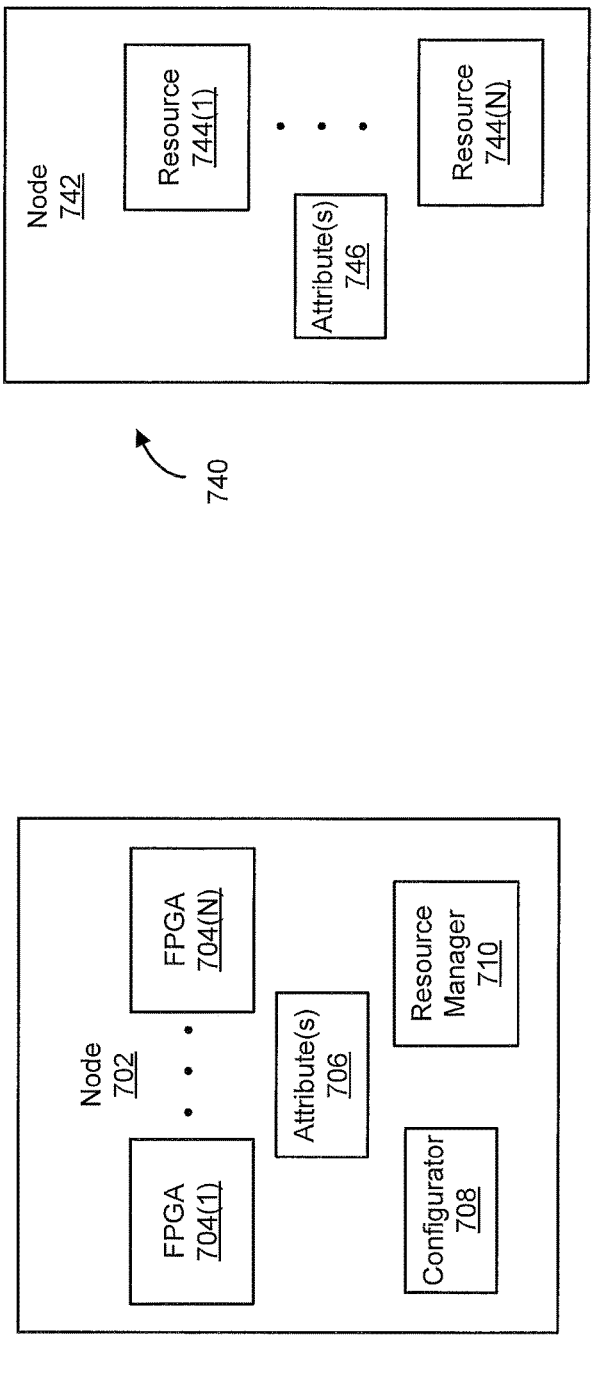
*Fig. 7A*
*Fig. 7C*
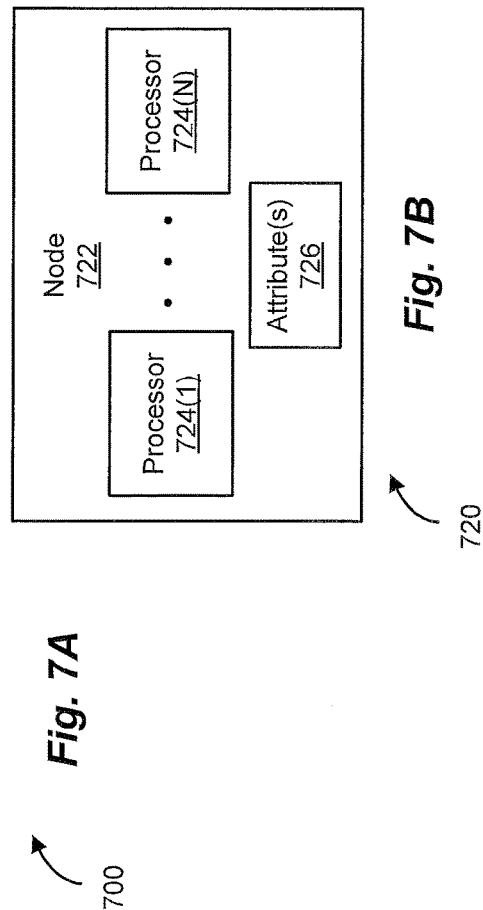
*Fig. 7B*

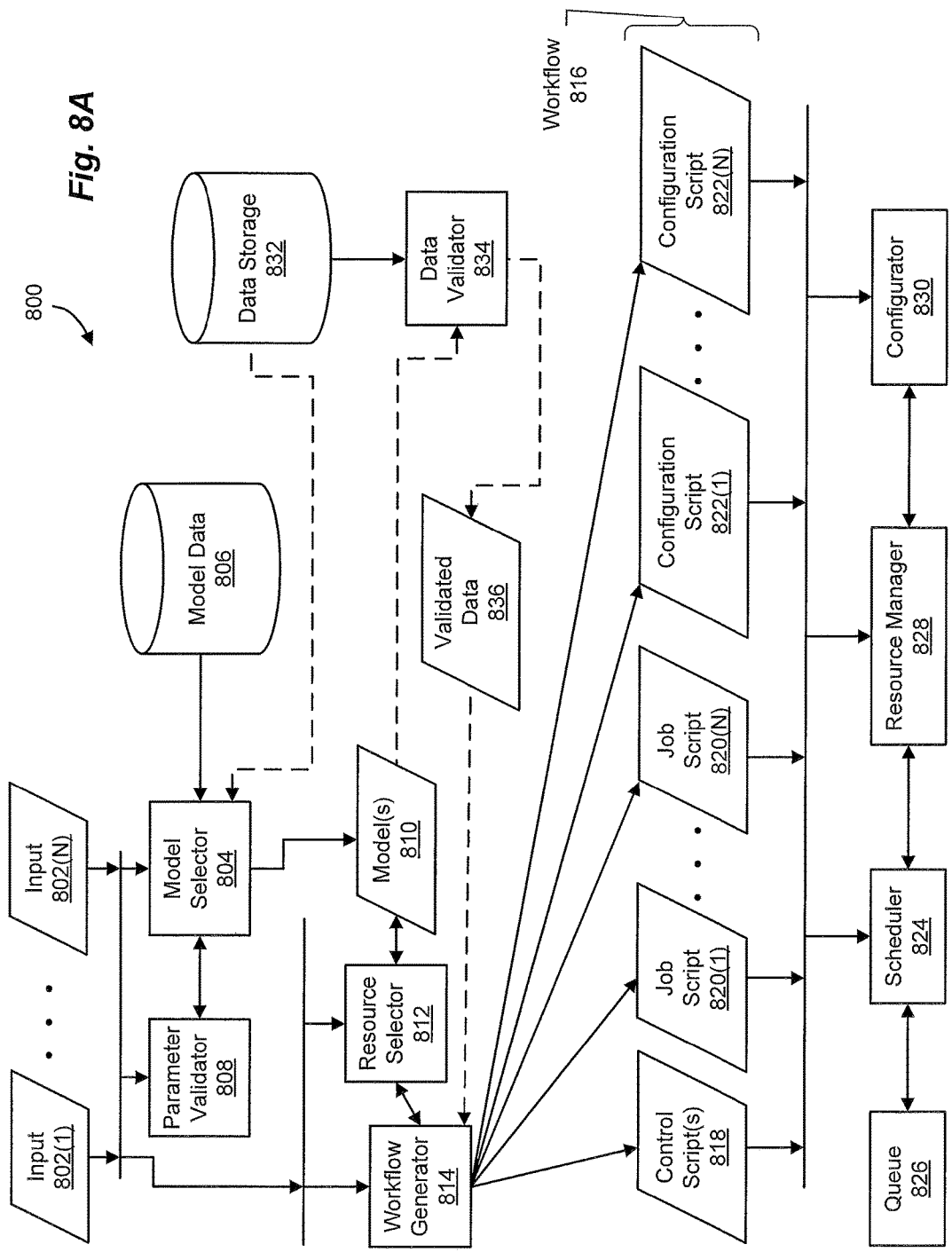

```
#!/bin/bash
FIRST=`qsub bwa-aln-step.sh`
echo $FIRST
SECOND=`qsub -W depend=afterok:$FIRST bwa-sampe-
step.sh`
echo $SECOND
```

*Fig. 8B*

```
#!/bin/bash
#PBS -mabe
#PBS -Nbwa-aln
bwa_reference="/tmp/human_g1k_v37.fasta.gz"
bwa_read1="/tmp/data/SRR002813_1.filt.fastq.gz"
bwa_read2="/tmp/data/SRR002813_2.filt.fastq.gz"
cd /opt/convey/cnybwa/bin
./cnybwa aln -t 4 $bwa_reference $bwa_read1 -f /tmp/data/
output1.sai
./cnybwa aln -t 4 $bwa_reference $bwa_read2 -f /tmp/data/
output2.sai
```

*Fig. 8C*

```
#!/bin/bash
#PBS -mabe
#PBS -Nbwa-sampe
#PBS -l nodes=1:GPU
reference="human_g1k_v37.fasta.gz"
sai1="/tmp/data/output1.sai"
sai2="/tmp/data/output2.sai"
seq1="/tmp/data/
SRR002813_1.filt.fastq.gz"
seq2="/tmp/data/
SRR002813_2.filt.fastq.gz"
cd /opt
./bwa sampe -t 8 $reference $sai1 $sai2
$seq1
$seq2 > /tmp/data/final.sam
```

*Fig. 8D*

```
#!/bin/sh
# Configuration Script
# Copyright Nimbix, Inc 2012

cd /opt
# Select FPGA bitstream required for supported
application types
/opt/sbin/activerecipe 2-release-1.3.0-11_09_19
# Restart node to activate new bitstream
reboot
```

```
#!/bin/bash
set -xv
cd /home/nimbix/output
qsub -mabe -M$user_email -N$job_name -l$node_args ../
app_scripts/$sws
```

RECONFIGURABLE CLOUD COMPUTING

CROSS-REFERENCE TO RELATED APPLICATIONS

The present patent application is a continuation of U.S. patent application Ser. No. 14/282,407, filed on May 20, 2014, entitled "Reconfigurable Cloud Computing," which is a continuation of U.S. patent application Ser. No. 13/449,003, filed on Apr. 17, 2012, entitled "Reconfigurable Cloud Computing," and issued as U.S. Pat. No. 8,775,576 on Jul. 8, 2014, and is incorporated by reference herein in its entirety and for all purposes as if completely and fully set forth herein.

BACKGROUND OF THE INVENTION

Field of the Invention

This application relates to distributed execution. Particularly, this application relates to distributed execution of application using a cloud computing environment.

Description of the Related Art

High Performance Computing (HPC) systems allow users to access high-performance computer resources to execute various workloads. In recent years, such HPC systems have been used instead of stand-alone supercomputers. A distributed HPC system can include multiple workstations or servers that are connected using a network, such as a high-performance network. In a typical distributed HPC system, computational power, storage power, and functionality of HPC devices can be made available to a user over a network. As a result, distributed HPC systems can provide high quality of service to users that can be located virtually anywhere in the world.

HPC systems can be used to execute applications that require processing of large data sets, including genomics, seismic, various analytics, and nuclear physics, among many other scientific and industrial applications. These are examples of very computationally-intensive applications, and many users simply do not themselves have the computational resources to quickly process these types of data. However, such distributed HPC systems can be difficult to use, and thus limit the type of users that can perform these HPC tasks.

SUMMARY OF THE INVENTION

Various systems and methods for using a distributed computing system are disclosed. For example, one method involves identifying a first application to be executed, configuring a computing node in a first configuration, and executing, according to a first workflow, at least a portion of a first application and at least another portion of the first application. The method also involves identifying a second application to be executed, configuring the computing node in a second configuration, and executing, according to a second workflow, at least a portion of a second application and at least another portion of the second application. The computing node includes a plurality of computing resources. The configuring the computing node in the first configuration includes configuring a first computing resource of the plurality of computing resources to execute at least the portion of the first application according to the first workflow, and configuring a second computing resource of the plurality of computing resources to execute at least the another portion of the first application according to the first workflow. Further, the first computing resource is of a first type of a plurality of types of computing resources, and the second computing resource is of a second type of the plurality of types of computing resources. The configuring the computing node in the second configuration includes configuring the first computing resource to execute at least the portion of the second application according to a second workflow, and configuring the second computing resource to execute at least the another portion of the second application according to the second workflow.

BRIEF DESCRIPTION OF THE DRAWINGS

The embodiments of the present application may be better understood, and its numerous objects, features, and advantages made apparent to those skilled in the art by referencing the accompanying drawings.

FIG. 3B illustrates an example of parameters used by the method for using a distributed computing system, according to one embodiment.

FIGS. 7A-7C are block diagrams of nodes, according to some embodiments.

FIG. 8A is a block diagram illustrating operation of a distributed computing system, according to one embodiment.

FIGS. 8B-8F illustrate examples of various scripts, according to some embodiments.

Figure 1:
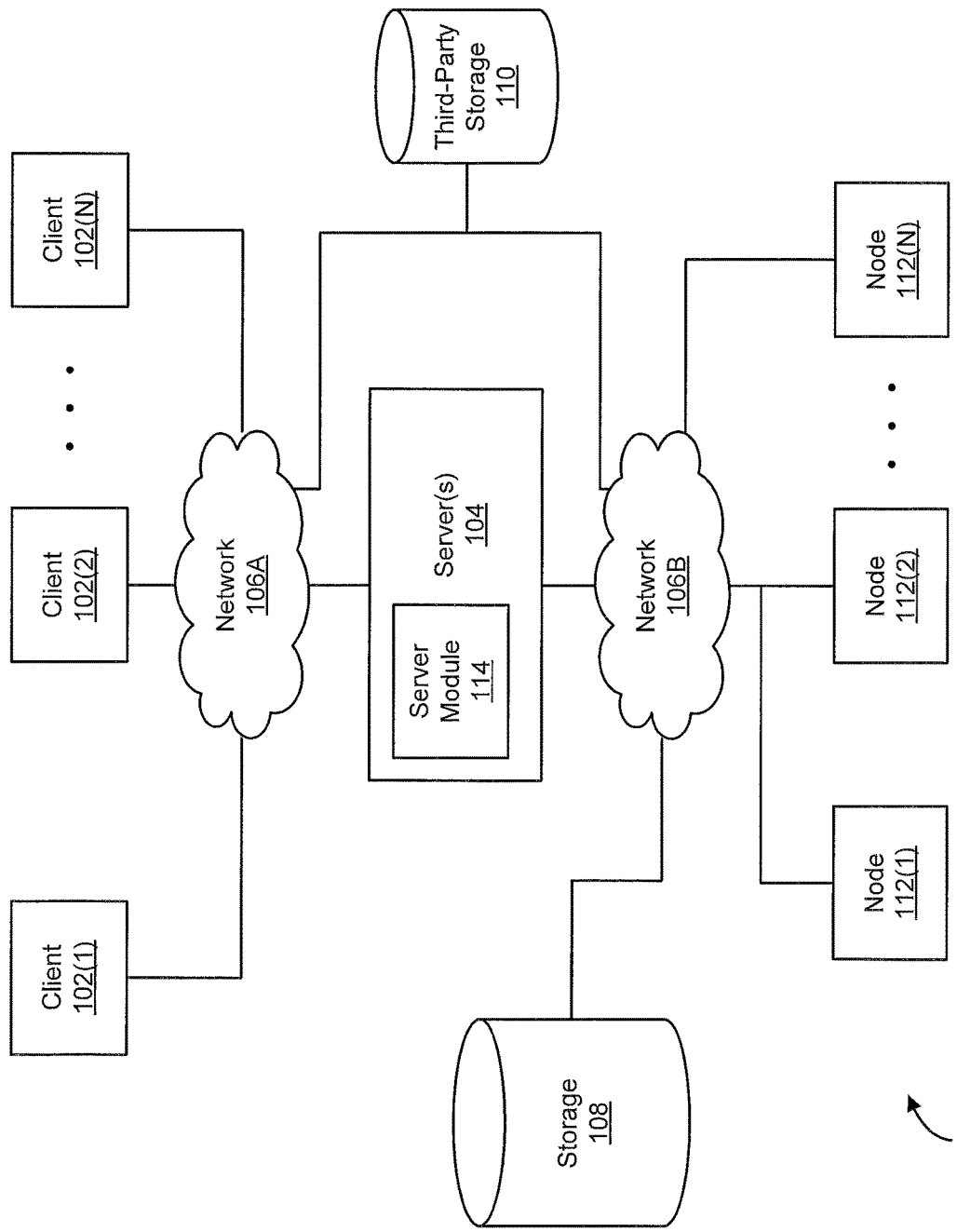
FIG. 1 is a block diagram illustrating a distributed computing system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Distributed computing systems (such as distributed High Performance Computing (HPC) systems) allow clients to schedule execution of various applications. For example, a user can schedule execution of a data mining application to data mine a database for various keywords and/or concepts. In another example, a user can schedule a genetics application to perform DNA sequencing operations. A distributed computing system, such as a cloud-based system, can allow clients to store user data using cloud storage, and select an application for execution using this stored data. This application can be stored, accessed, and/or executed, using a remote server. As a result, the user can perform complex operations on data without incurring costs for expensive server(s), application(s), and/or data storage. Embodiments of such a distributed computing system are described below.

FIG. 1 is a block diagram illustrating a distributed computing system 100 that includes a collection of clients, server(s), and storage. Distributed computing system 100 includes several clients, server(s), and storage, e.g., client(s) 102(1)-102(N), server(s) 104, storage 108, third-party storage 110, and one or more nodes 112(1)-112(N). Each of clients, server(s), and storage can communicate with each other using one or more networks, e.g., network 106A and 106B. Each of network 106A and 106B can include the Internet, a local area network (LAN), a wide area network (WAN), a storage area network (SAN), and/or any combination thereof. It is noted that distributed computing system 100 may include a different number of elements.

Each client, e.g., client(s) 102(1)-102(N), can be implemented as a computing entity, including but not limited to, a computer, a phone (e.g. a smart phone), a tablet, a virtual machine, among others. Each client can access a server, e.g., server(s) 104), such as by issuing a request to execute an application. Each client can also access, such as using network 106A, user data that is stored using third-party storage 110. Each client can also store, using network 106A, such user data at third-party storage 110. Each client can provide one or more parameters to the server. These parameters can include location and/or type of data, operation(s) to be performed on this data, and/or type and/or name of application(s), among others. In one implementation, the client can access the network, e.g., the Internet, using an Internet browser to provide such request. The server can access this data, according to the provided parameters, perform the specified operation(s), and then return results to the client(s). In essence, server 104 provides HPC services (e.g., access to application(s)) to client(s) 102(1)-102(N) over network(s), and that can be referred to as using a cloud, since the user data, the applications that operate on that data, computing nodes that execute such applications, and/or the server(s) that control these operations are distributed over one or more networks. These HPC services can be easily accessed by client(s) 102(1)-102(N), i.e., by requests that simply specify parameters that indicate desired operations(s) on data.

The server includes a server module (e.g., a server module 114). Server module 114 can receive a request from the client(s) 102(1)-102(N) via network 106A. Server module 114 can select an application based on this request. For example, the request can include parameters that indicate operation(s) to be performed on data, and thus server module 114 can select an application that can perform these operation(s). Server module 114 can select computing resources for this application. Server module 114 can communicate over network 106B with nodes 112(1)-112(N) to send communication (e.g., based on a workflow) to execute the application using the selected computing resources. Server module 114 can receive the execution results of the application from the node(s). Server module 114 can then return these results to the client that initiated the request. Server module 114 can access various models and data in storage 108 during operation. Examples of server 104 are provided in FIG. 16, and more generally, in FIGS. 18 and 19. Examples of server module 114 are provided in FIGS. 6A and 6B, among others.

Each node 112(1)-112(2) can include one or more computing resources. A node, e.g., node 112(1), can receive communication, over network 106B, (e.g., based on a workflow) from server module 114 to execute an application using one or more computing resources. The application can access the data from third-party storage 110 during such execution, as specified by the parameters. The node(s) can return results of the application execution to server module 114. Examples of nodes 112(1)-112(N) are provided in FIGS. 7A-7C, and FIG. 17, and more generally, in FIGS. 18 and 19.

Each client, e.g., 102(1)-102(N), can access, such as over network 106B, third-party storage, e.g., 110. Third-party storage 110 can include one or more distributed storage devices and/or external cloud storage, among others. Third-party storage 110 can store data, such as data that is stored by the client(s). This stored data that can be operated on by the application. In one implementation, third-party storage can be implemented by a cloud storage element, allowing client(s) to upload and store their data separately from the client(s).

The network, e.g., network 106A and/or 106B, can include the Internet and/or other network(s), such as LAN, WAN, and/or SAN. The network is configured to allow communication between the client(s), server(s), and/or storage. In one implementation, the client(s) can access other elements of the distributed computing system using a first type of network (e.g., WAN), whereas the server(s) can access other elements of the distributed computing system using a second type of a network (e.g., LAN).

Figure 2:
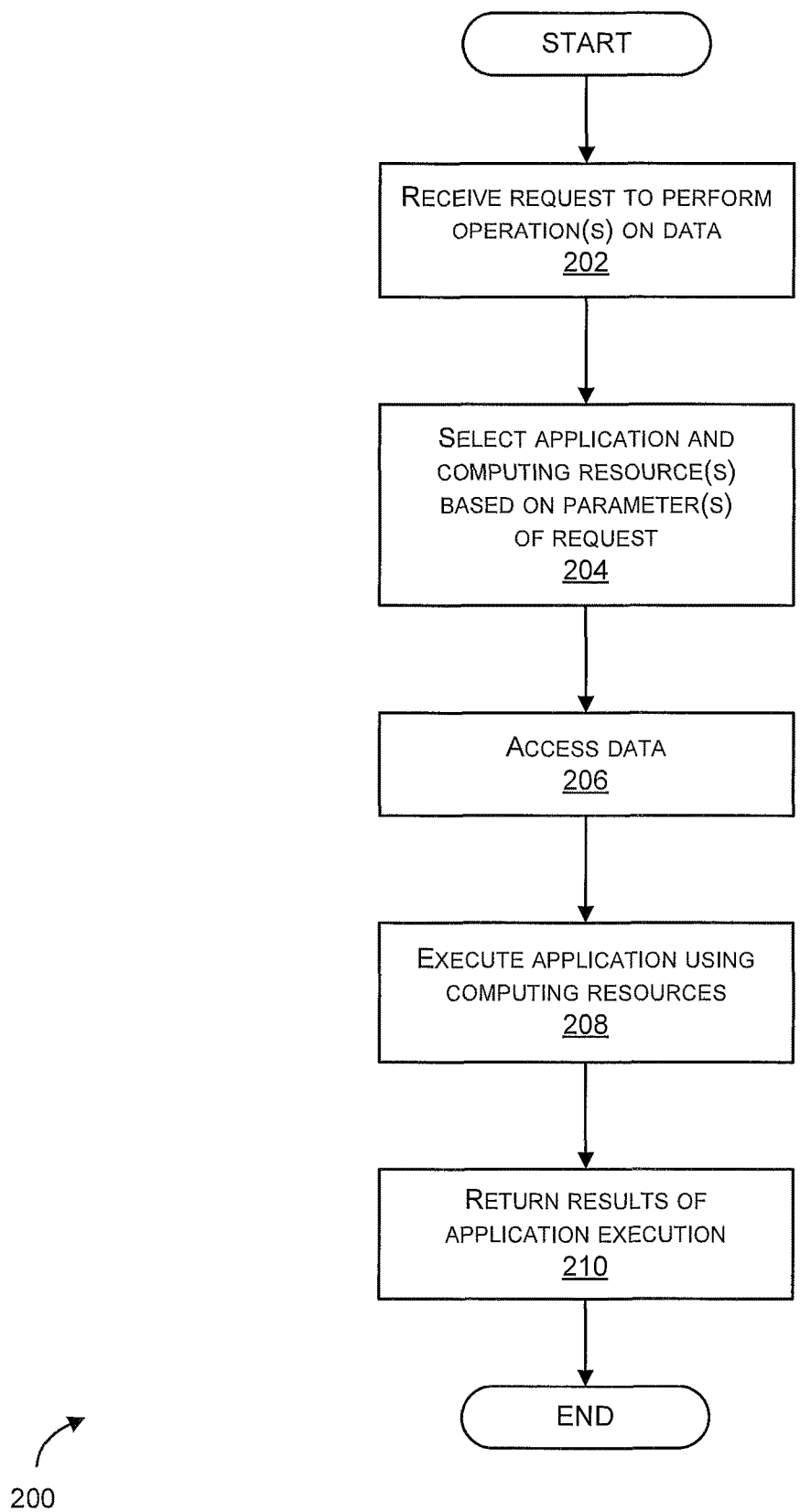
FIG. 2 is a flowchart illustrating a method for using a distributed computing system, according to one or more embodiments.

FIG. 2 is a flowchart illustrating a method 200 for using a distributed computing system, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, method 200 is implemented by server module 114.

In element 202, a request to perform one or more operations on data is received, according to one embodiment. For example, server module 114 can receive, using network 106A, this request from client 102(1). The request can include various parameters that indicate, for example, the operations to be performed and the data on which the operations are to operate, among others.

In element 204, application and resource(s) are selected based on the parameters, according to one embodiment. For example, server module 114 can select an application and one or more computing resources, based on the parameters. The computing resources can be located on one or more nodes (e.g., nodes 112(1)-112(N)). The application can be executed using these computing resources, and the application can be configured to execute to perform the specified operations.

In element 206, data is accessed, according to one embodiment. For example, node 112(1) can access stored data that is stored using third-party storage 110 (such as using cloud storage). In one embodiment, the selected computing resource(s) can perform this data access, such as prior to executing the application. It is noted that in one embodiment, the data access of element 206 is performed as a part of element 208.

In element 208, the application is executed using the computing resources, according to one embodiment. The application is executed based on the parameters of the request, according to one embodiment. In one implementation, the selected computing resource(s) can access the data (e.g., from third-party storage) during the execution of the application.

In element 210, the results of the application execution can be returned (such as over network 106A) to the client(s) that initiated the request. Method 200 is described in more detail below, such as with respect to FIGS. 3 and 4. In some embodiments, various elements of method 200 can be executed by server module 114, and other elements of method 200 can be executed by one or more nodes 112(1)-112(N).

Figure 3A:
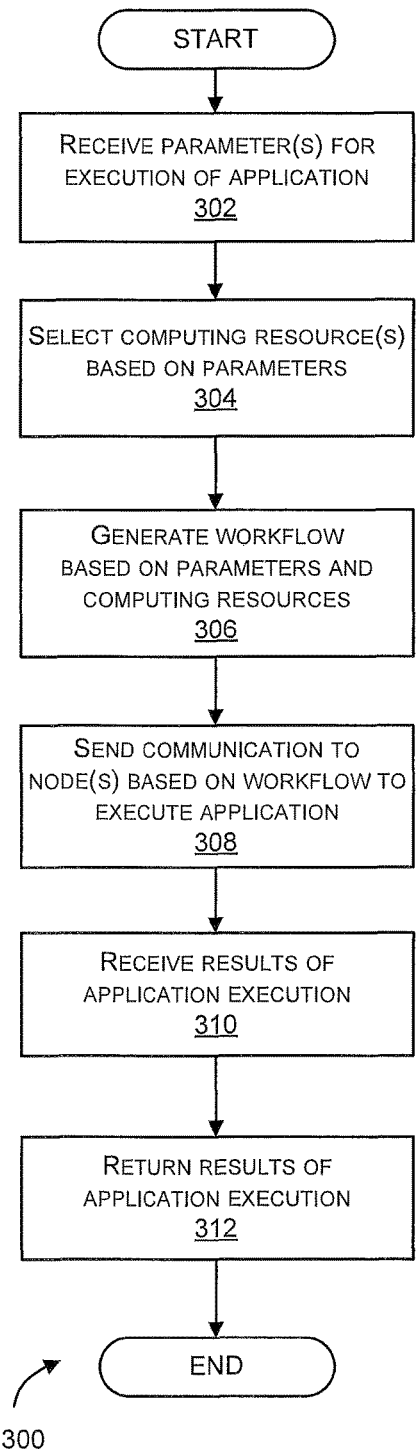
FIG. 3A is flowchart illustrating a method for using a distributed computing system by a server, according to one or more embodiments.

FIG. 3 is a flowchart illustrating a method 300 for using a distributed computing system, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 300 is described with reference to variations of the elements described in connection with FIG. 1. In one embodiment, method 300 is implemented by server module 114.

In element 302, parameters for execution of an application are received, according to one embodiment. For example, server module 114 can receive, using network 106A, the parameters from client 102(1). A request from one of the clients can include these parameters. In one embodiment, the parameters can include one or more of the following parameters, as also shown in FIG. 3B (which illustrates various parameters 350 that can be provided using the request):

Application(s)—desired application(s) 356 to be executed, the application parameters can include location of executable binaries (such as on storage);

Operation(s)—desired operation(s) (e.g., functions) of the applications to be executed, operation(s) may be listed for each of the application(s) specified above, each of the specified operation(s) can also include specified execution parameters, operation(s) can specify (implicitly or explicitly) any data dependency between any multiple operations;

Resource(s)—desired resource(s) for execution of each of the application(s);

Customer(s)—customer(s) 358 making the request, may include associated user name, password, email address, and other contact information;

Data file(s)—location, size, and/or data type parameter(s) for the data file(s) 352 that is to be operated on by the application (e.g., as input data), location information can include names and/or path names of data files on the third-party storage.

In element 304, computing resource(s) are selected based on the parameters, according to one embodiment. For example, server module 114 can select one or more computing resources based on the parameters. The computing resources can be located on one or more nodes (e.g., nodes 112(1)-112(N)). Server module 114 can also select an application that is to be executed using the selected computing resource(s).

In element 306, a workflow is generated based on the parameters and the selected computing resources, according to one embodiment. For example, server module 114 can generate such a workflow. The workflow can include various components (e.g., scripts), that can indicate execution details, such as which computing resources to use, which application to execute, specific parameters for the computing resource(s) and/or the application, among others.

In element 308, communication is sent to the one or more nodes based on the workflow, according to one embodiment. This communication is configured to indicate to the node(s) to execute the application. For example, server module 114 can communicate (e.g., over network 106B) instructions to the nodes to initiate execution of the application. In one embodiment, server module 114 can communicate at least a portion of the workflow to one or more of nodes 112(1)-112(N), such as to the node(s) that include the selected computing resources (i.e., selected in element 204). In one embodiment, server module 114 can also queue this workflow, or elements of the workflow, prior to performing the communication of element 308. Server module 114 can then send the communication to the node(s) in accordance with a scheduling method. In one embodiment, the communication that is sent to the node(s) includes job script(s) and/or configuration script(s). Server module 114 can use the control script(s) to control the scheduling and/or operation of the job scripts, and/or configuration of the selected computing resources.

In element 310, the results of execution of the application are received, such as by server module 114, according to one embodiment. These results can be sent from one or more nodes 112(1)-112(N), such as from the node that includes the selected computing resource where the application was executed. In element 212, the results can be returned to the client(s), such as over network 106A.

Figure 4:
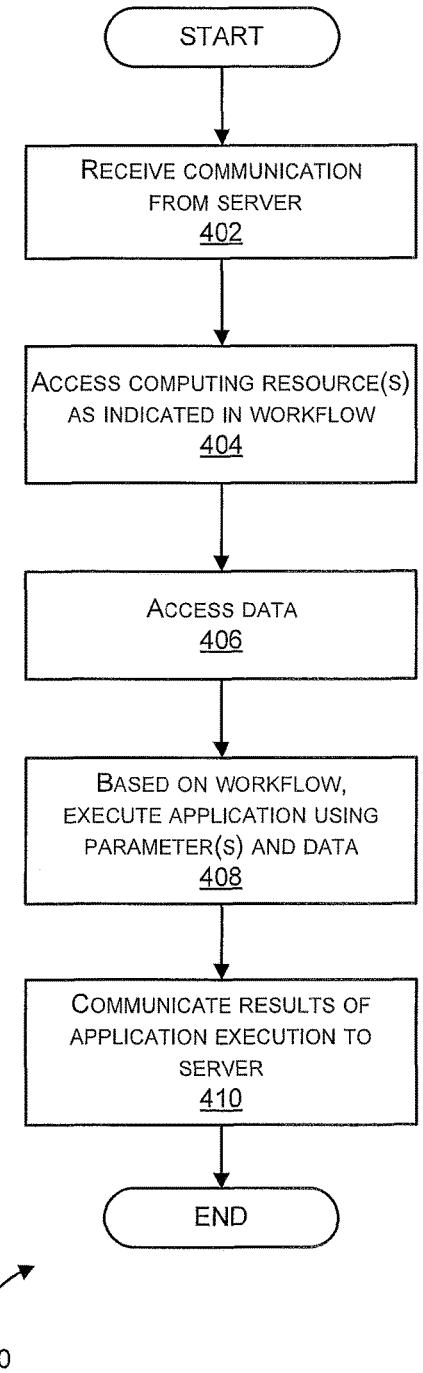
FIG. 4 is flowchart illustrating a method using a distributed computing system by a node, according to one or more embodiments.

FIG. 4 is a flowchart illustrating a method 400 for operating a distributed computing system, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 400 is described with reference to variations of the elements described in connection with FIG. 1. In one embodiment, method 400 is implemented by one or more of node(s) 112(1)-112(N).

In element 402, communication from server is received, according to one embodiment. For example, node 112(1) can receive communication, based on the workflow, from server module 114. This communication can indicate how and where to execute an application, as described below. In one embodiment, this communication can include parts of the workflow, such as job script(s) and/or configuration script(s). For example, as indicated by a workflow (e.g., control script(s)), a scheduler module (on the server) can instruct (using job script(s)) node(s) to execute selected operation(s) of application(s) using data accessed from the third-party storage. Examples of script(s) are provided in FIGS. 8B-8F, among others.

In element 404, computing resource(s) are accessed as indicated in the workflow, according to one embodiment. For example, node 112(1) can access one or more computing resources. Node 112(1) can also configure one or more of these resource(s), as indicated in the workflow. In one embodiment, node 112(1) can perform some scheduling functionality. For example, node 112(1) can queue at least portions of the received workflow, and execute these queued workflow portion(s) when the selected computing resources become available.

In element 406, data is accessed, according to one embodiment. For example, node 112(1) can access stored data that is stored using third-party storage 110 (such as using cloud storage). In one embodiment, the selected computing resource(s) can perform this data access, such as prior to executing the application. It is noted that in one embodiment, the data access of element 406 is performed during element 408.

In element 408, the application is executed, based on the workflow, using parameters and the data, according to one embodiment. For example, the selected computing resources can execute the application. In one embodiment, the selected computing resource(s) can access the data (e.g., from third part storage) during the execution of the application. The computing resources can be located on one or more nodes (e.g., nodes 112(1)-112(N)).

In element 410, the results of execution of the application are communicated to the server, according to one embodiment. For example, node(s) 112(1)-112(N) can communicate the execution results to server module 114. These results can be sent by the node that includes the selected computing resource where the application was executed.

Figure 5:
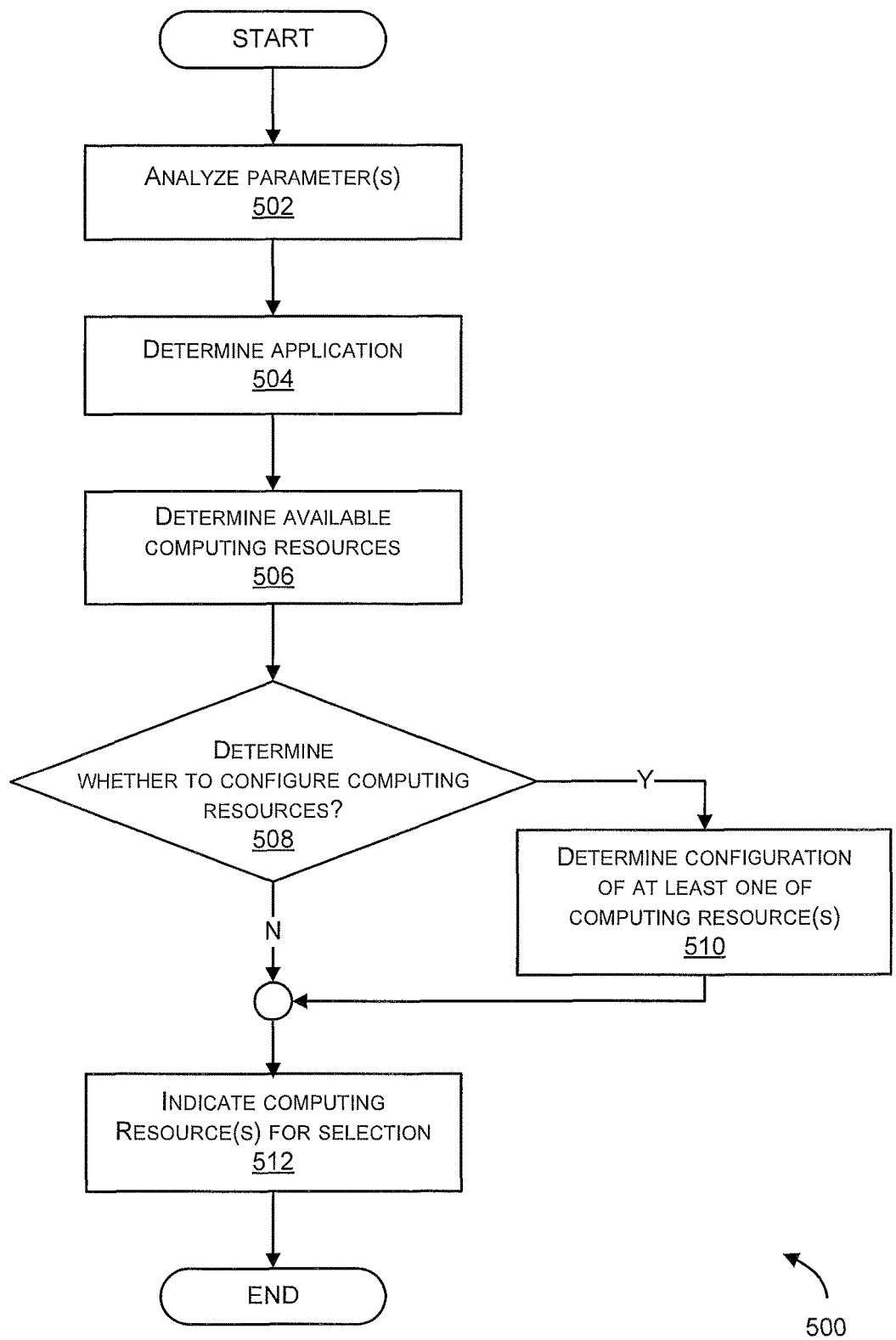
FIG. 5 is flowchart illustrating elements of a method for using a distributed computing system, according to one or more embodiments.

FIG. 5 is a flowchart illustrating a method 500 for selecting computing resources, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIG. 1. In one embodiment, method 500 is implemented by server module 114. In one embodiment, method 500 implements at least portions of elements 304 and/or 306 of method 300.

In element 502, parameters are analyzed, according to one embodiment. For example, server module 114 can analyze the parameters of the received request. During this analysis, server module 114 can determine that the parameters indicate location and/or type of data (that is to be accessed during execution of a certain application), operation(s) to be performed on this data, and/or type and/or name of application(s), among others. For example, the parameters can indicate that certain gene sequencing operations are to be performed on data that is located on cloud storage.

In element 504, an application is determined, according to one embodiment. For example, server module 114 can determine what application is to be executed. Server module 114 can make this determination based on the analysis of the parameters (e.g., on element 502). For example, server module 114 can determine that a Burrows-Wheeler Aligner (BWA) application should be used to perform the gene sequencing operation specified by the received request. Furthermore, server module 114 can also determine that two separate applications should be executed. The first application can be a BWA application, that can perform a BWA align operation. The second application can be Sequence Alignment/Map (SAM) application, for example, which can perform various operations on the output of the BWA align operation. It is noted that server module 114 can determine (based on the parameters of the request and/or a model, as described below) that multiple operations of a single application should be performed, such as multiple operations of the SAM application.

In element 506, available computing resources can be determined, according to one embodiment. For example, server module 114 can determine which of the multiple computing resources of node(s) 112(1)-112(N) can be used to execute the application. For example, each node can include a different set of computing resources, e.g., node 112(1) can include Field Programmable Gate Arrays (FPGA) (and/or any other type of reconfigurable logic devices, including erasable programmable logic devices (EPLDs), complex programmable logic devices (CPLDs), and/or programmable array logic (PALs), commonly referred to herein as FPGAs) computing resources, node 112(2) can include graphical processing unit (GPU), central processing unit (CPU), digital signal processing (DSP) resources, or a combination, such as a computing resource having both DSP and FPGA elements. Server module 114 can determine that the selected application is to be executed using a certain resource of node 112(1). In another example, server module 114 can determine that the BWA application (i.e., implementing the align operation) is to be executed on one resource of node 112(1), and that a certain operation of the SAM application is to be executed on another resource, such as of another node 112(2).

In one embodiment, attributes of the nodes can be accessed when making this determination. For example, these attributes can characterize computing resources of each node. These attributes can be compared, and then matched, to any resource requirements that are implicitly and/or explicitly included in the parameters. In one implementation, each application can be characterized by a model, and each such model can include resource requirements for that application and/or operations of that application. The resource requirements can also specify any resources needed to perform the operation(s) of the request.

In element 508, a determination is made as to whether to configure the computing resource(s), according to one embodiment. For example, server module 114 can determine whether any of the selected resources should be configured prior to execution. Element 510 may be executed for each computing resource that is selected (and that can be configured). The node hosting each such computing resource can, e.g., during scheduling, determine whether that respective computing resource should be configured prior to executing a certain application (as described below with reference to FIG. 12). In other words, server module 114 can determine whether to perform a configuration of the computing resources (e.g., hardware FPGA and/or GPU resources, among others) based on request from the client.

However, in one embodiment, this request does not include any reconfiguration requests, and instead server module 114 makes this determination. For example, server module 114 can determine that FPGA, GPU, and/or CPU computing resource(s) can execute faster once configured for the determined application. Server module 114 can make this determination based on the model and resource attributes of each computing resource. For example, the model can indicate (i.e., in resource requirement(s)) that a certain bit stream of an FPGA is needed. Server module 114 can compare this resource requirement to the resource attributes of the selected computing resource (i.e., the FPGA). Server module 114 can then determine that this FPGA, while can support the resource requirement, should be reconfigured prior to executing the determined application. Furthermore, server module 114 can determine that multiple FPGAs (e.g., on a single resource node) should be reconfigured to support a parallel execution mode (as specified by resource requirements). Similarly, server module 114 can determine that the selected GPU/CPU computing resources should be reconfigured (e.g., to place the GPU/CPU in a different operating mode).

In element 510, a configuration of at least one of the computing resources is determined, according to one embodiment. For example, server module 114 can determine a configuration for the selected computing resource(s). In another embodiment, server module 114 can determine a respective configuration for each computing resource that is configurable, not just for the selected computing resource(s). For both of these embodiments, the configurations can be used when generating the workflow. This determination of element 510 is used to generate the workflow, such as in element 306.

In element 512, the computing resource(s) are indicated for selection, according to one embodiment. For example, server module 114 can indicate that the computing resources (i.e., as determined in element 506) are to be selected. Server module 114 can also indicate whether (and how) one or more of the selected computing resources (i.e., as determined in elements 508 and/or 510) are to be configured. It is noted that in element 512, server module 114 can indicate that the application (as determined in element 504) is to be executed on the selected computing resources. These selection indications are then used during the workflow generation (i.e., element 306).

Figure 6A:
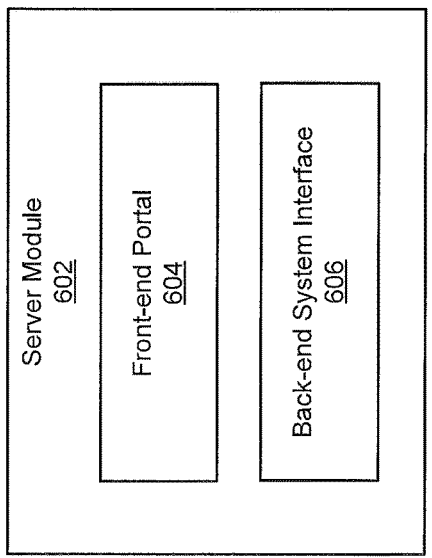
FIGS. 6A and 6B are block diagrams illustrating a server module, according to one or more embodiments.

FIG. 6A is a block diagram 600 of a server module 602, according to one or more embodiments. Server module 602 can be an implementation of server module 114. In one embodiment, server module 602 includes a front-end portal 604 and a back-end system interface 604. Front-end portal 604 can communicate with clients (e.g., clients 112(1)-112(N)), with the storage (e.g., storage 108) and/or third-party storage (e.g., third-party storage 110), and with back-end system interface 606. In one embodiment, back-end system interface 606 can communicate with front-end portal, with the storage (e.g., storage 108), and with the nodes (e.g., nodes 112(1)-112(N)). It is noted that server module 602 may include a different number of elements.

Figure 6B:
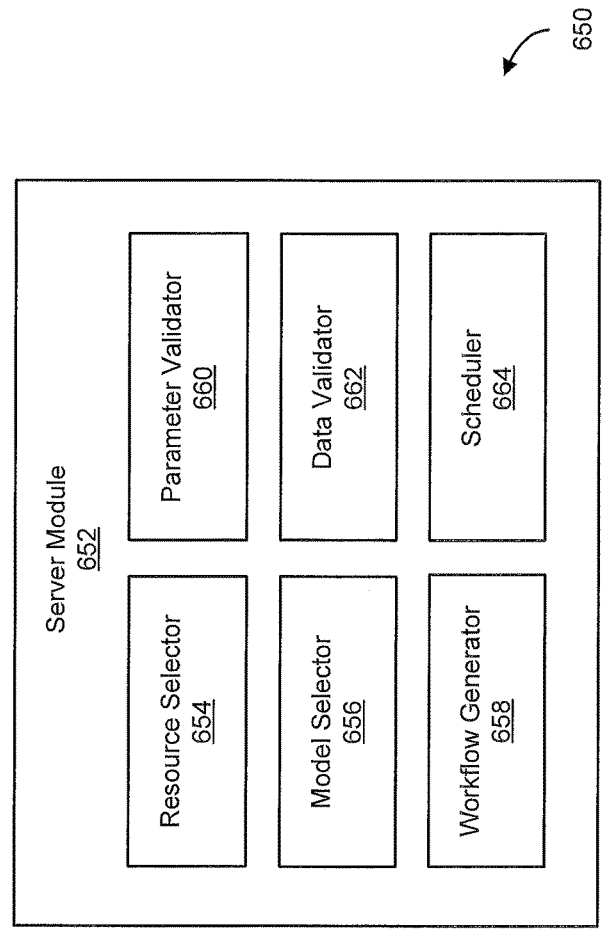

FIG. 6B is a block diagram 650 of a server module 652, according to one or more embodiments. Server module 652 can be an implementation of server module 114. In one embodiment, server module 652 includes a resource selector 654, a model selector 656, a workflow generator 658, a parameter validator 660, a data validator 662, and scheduler 664, among others. It is noted that server module 652 may include a different number of elements. For example, various elements of server module 652 can be combined, as desired. Furthermore, one or more of elements of server module 652 can be implemented by one or more nodes (e.g., nodes 112(1)-112(N). For example, at least some of functionality of scheduler 664 can be implemented by one or more nodes. The operation of various elements of server module 652 is described below with reference to FIGS. 8 and 16, among others. Furthermore, one or more of these elements may be implemented as software and/or hardware modules.

FIGS. 7A-7C are block diagrams 700, 720, and 740, respectively, of nodes, according to some embodiments. Each such node can include one or more computing resources and some attributes (e.g., resource attributes) that characterize these computing resources. The computing resources can be used to execute an application. Depending on the type of computing resource, at least some of such application can reside on the node and/or on the computing resource itself. For example, for FPGAs, some functions of such application can be implemented by each FPGA. In another example, for GPUs, some functions of such application can be executed by each GPU. However, other implementations are contemplated.

FIG. 7A illustrates a node 702 that includes FPGA computing resources 704(1)-704(N) and one or more attributes 706. In one embodiment, each FPGA computing resource 704(1)-704(N) can execute an application, as indicated in a workflow. In another embodiment, each FPGA computing resource 704(1)-704(N) can execute a portion of an application, whereas node 702 can execute (e.g., by using separate processor(s), not shown in this figure) any remaining functionality of this application. Furthermore, node 702 includes a configurator 708 and a resource manager 710, operations of which are described below, e.g., with reference to FIG. 8. It is noted that although only FIG. 7A shows a configurator and a resource manager, in one embodiment, each node can include both of these elements. However, in another embodiment, configurator 708 and resource manager 710 of one of the nodes can be used by the remaining nodes.

For example, each FPGA computing resource 704(1)-704(N) can execute one or more functions (such as algorithm-intensive functions and/or functions can be performed in parallel). Each FPGA computing resource 704(1)-704(N) can thus execute a separate function (and/or a different instance of some function) in parallel, thus increasing an overall performance of an application. In one embodiment, node 702 can, upon receiving at least a part of the workflow (i.e., from the server module), execute the application. For example, a scheduler on the server module can send job scripts to the node, where each job script indicates an application that is to be executed on a certain FPGA computing resource.

Node 702 and/or individual FPGA computing resource(s) 704(1)-704(N) can access data (e.g., from a third-party storage) when executing the application. The application that is being executed by node 702 and/or individual FPGA computing resource(s) 704(1)-704(N) can be stored on node 702, on the server module, and/or storage 108. Furthermore, attribute(s) 706 can include various attributes for FPGA computing resource(s) 704(1)-704(N) and/or node 702. Attribute(s) 706 can include metadata about the capabilities of FPGA computing resource(s) 704(1)-704(N) and/or node 702. FPGA computing resource(s) 704(1)-704(N) can be configured, such as indicated in the workflow (e.g., by configuration script(s)).

FIG. 7B illustrates a node 720 that includes processor computing resources 724(1)-724(N) and one or more attributes 726. In one embodiment, each processor computing resource 724(1)-724(N) can execute an application, as indicated in a workflow. In another embodiment, each processor computing resource 724(1)-724(N) can execute a portion of an application, whereas node 722 can execute (e.g., by using separate processor(s), not shown in this figure) any remaining functionality of this application. Each processor computing resource can be a GPU, and/or another dedicated processor. For example, each processor computing resource 724(1)-724(N) can execute one or more functions (such as compute-intensive functions/algorithms and/or functions/algorithms that can be performed in parallel). Each processor computing resource 724(1)-724(N) can thus execute a separate function (and/or a different instance of some function) in parallel, thus increasing an overall performance of an application. In one embodiment, node 722 can, upon receiving at least a part of the workflow (i.e., from the server module), execute the application. For example, a scheduler on the server module can send job scripts to the node(s), where each job script indicates an application that is to be executed on a certain processor computing resource.

Node 722 and/or individual processor computing resource(s) 724(1)-724(N) can access data (e.g., from a third-party storage) when executing the application. The application that is being executed by node 722 and/or individual FPGA computing resource(s) 724(1)-724(N) can be stored on node 722, on the server module, and/or storage 108. Furthermore, attribute(s) 726 can include various attributes for processor computing resource(s) 724(1)-724(N) and/or node 722. Attribute(s) 726 can include metadata about the capabilities of processor computing resource(s) 724(1)-724(N) and/or node 722. Processor computing resource(s) 724(1)-724(N) can be configured, such as indicated in the workflow (e.g., by configuration script(s)).

FIG. 7C illustrates a node 740 that includes another type of computing resources 744(1)-744(N) and one or more attributes 746. Similar to the computing resources of FIGS. 7A and 7B, each computing resource 744(1)-744(N) can execute an application or a portion of an application, as indicated in a workflow. Computing resource(s) 744(1)-744(N) can be also configured, such as indicated in the workflow (e.g., by configuration script(s)).

Figure 8E:
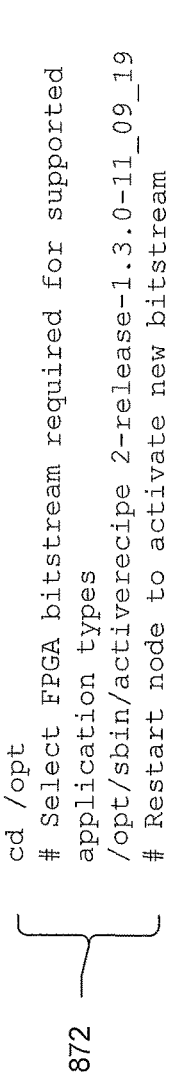

FIG. 8A is a block diagram 800 illustrating operation of a distributed computing system, according to one embodiment. FIGS. 8B-8F illustrate various scripts that can be used and/or generated by the elements of FIG. 8A, according to some embodiments.

One or more inputs 802(1)-802(N) can be received by a model selector 804 and/or a parameter validator 808. Both model selector 804 and parameter validator 808 can be included in a server module. Input(s) 802(1)-802(N) can be first received by an input/output module (not shown). Inputs 802(1)-802(N) include parameters that are received from a client, such as received in a request (e.g., see element 302). Model selector 804 can access model data 806 to select one or more models 810 for an application. Model selector 804 selects model(s) 810 based on input(s) 802(1)-802(N).

Each model can be associated with one or more applications. The model is associated with a certain application, where this application can perform the operation(s) described by input(s) 802(1)-802(N). In one embodiment, input(s) 802(1)-802(N) can identify an application. In this example, model selector 804 can check whether this identified application includes the operation(s) that are to be performed on data, as specified by input(s) 802(1)-802(N). For example, each model can include templates on how to generate various scripts, described below, for the application. Each model can also indicate one or more computing resource(s) where the application can be executed. Thus, in one embodiment, model selector 804 can perform element 504 of method 500, i.e., by selecting a model that corresponds to the application identified by the parameters (of the request).

Parameter validator 808 can validate input(s) 802(1)-802(N) prior to model selector 804 selecting model(s) 810. In one embodiment, model selector 804 also uses data from data storage 832 when selecting model(s) 810. The data from data storage 832 can be first verified by a data validator 834 prior to model selector 804 accessing this data (i.e., as validated data 836). For example, model 810 can include a data format. Data validator 834 can use data format of model 810 to verify that the data complies with the data format for the selected model, e.g., as described with reference to FIG. 9A.

Both resource selector 812 and workflow generator 814 receive model(s) 810 and/or inputs 802(1)-802(N). Resource selector 812 determines computing resources to be selected based on parameter(s) (of the request). In one embodiment, resource selector 812 can communicate with one or more nodes (e.g., nodes 112(1)-112(N)) in order to determine what computing resources are available on each node. Resource selector 812 can access model(s) 810 to determine what computing resource(s) are indicated as being suitable for application execution. Resource selector 812 can also determine if any of the determined computing resources can be configured prior to application execution, and if so, resource selector 812 can indicate how to configure each such computing resource. In one embodiment, resource selector operates to perform elements 506-512 of method 500. Furthermore, in one embodiment, model selector 804 and resource selector 812 are configured to perform element 304 of method 300.

Workflow generator 814 generates a workflow 816 that can include one or more control scripts 818, one or more job scripts 820(1)-820(N), and/or one or more configuration script(s) 822(1)-822(N). Workflow generator 814 can generate workflow 816 based on input(s) 802(1)-802(N), model(s) 810, as well as any indications and/or determinations made by resource selector 812, and optionally based on the data, such as the validated data. Control script(s) 818 are configured to control execution of the other elements of workflow 816. Job script(s) 820(1)-820(N) indicate how to execute the application(s) selected by model selector 804. Configuration script(s) 822(1)-822(N) indicate how to configure computing resource(s) that are determined by resource selector 812. In one embodiment, workflow generator is configured to perform element 306 of method 300.

Workflow 816 is communicated to a scheduler 824, a queue 826, a resource manager 828, and/or a configurator 830. In one embodiment, each of scheduler 824, resource manager 828, and configurator 830 can receive a different subset of workflow 816. In one embodiment, scheduler 824 can receive control script(s) 818 and job script(s) 820(1)-820(N), while configurator 830 receives configuration script(s) 822(N).

Figure 11:
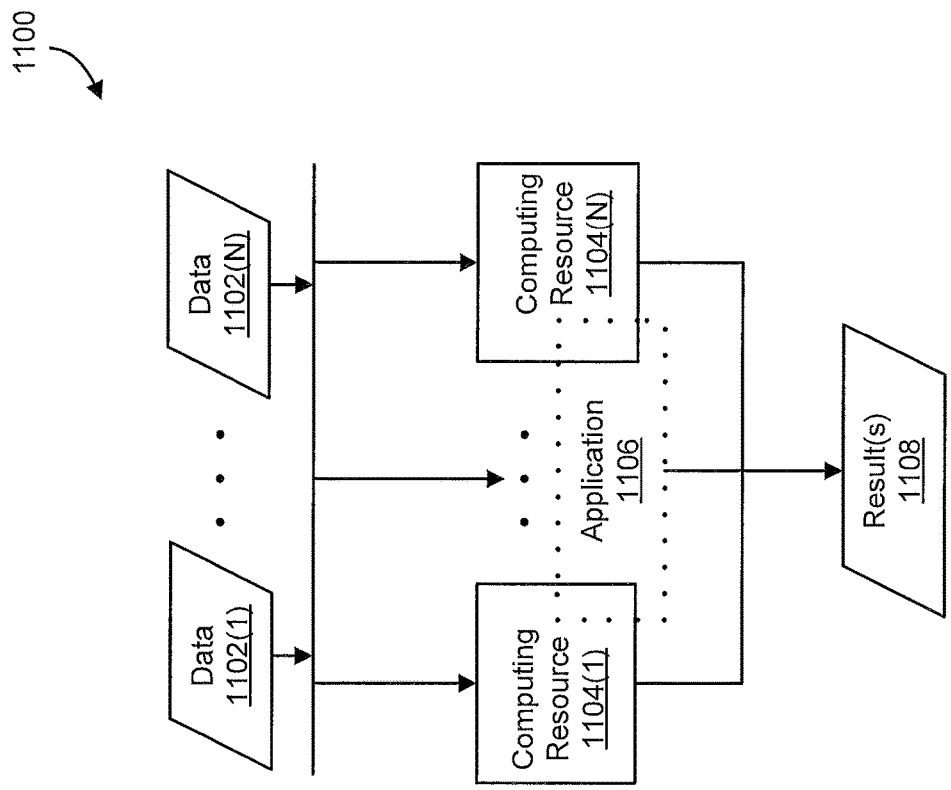
FIG. 11 is a block diagram illustrating operation of a resource, according to one embodiment.

Scheduler 824 can use control script(s) 818 to control operation of the other elements of workflow 816. For example, control script(s) 818 can indicate the order in which job scripts 820(1)-820(N) are to be accessed. Scheduler 824 can access queue 826 (such as described below with reference to FIG. 10A) as well as a one or more job scheduling algorithms, one example of which is illustrated in FIG. 11. In one embodiment, scheduler 824 can be implemented by the server module. In another embodiment, scheduler 824 can be implemented in part by the server module, and in part by one or more nodes.

For example, job script 820(1) can indicate that a BWA application is to be executed using certain data from data storage 832. Job script 820(2) can indicate that a SAM align application is to be executed using results from the execution of this BWA application. Therefore control script(s) 818 can indicate that job script 820(1) is accessed (e.g., executed) prior to job script 820(2) being accessed. Furthermore, control script(s) 818 can indicate that the BWA application (as indicated by job script 820(1)) is executed on a first computing resource (e.g., an FPGA), while the SAM application (as indicated by job script 820(2)) is executed on a second resource (e.g., a GPU processor). Control script(s) 818 can also indicate that prior to execution of the BWA application (as indicated by job script 820(1)), the FPGA computing resource (where this execution would take place) is re-configured first based on configuration script 822(1). Similarly, control script(s) 818 can also indicate that prior to execution of SAM application (as indicated by job script 820(2)), the GPU computing resource (where this execution would take place) is re-configured first based on configuration script 822(2).

Resource manager 828 can manage the execution of applications on various computing resources. Resource manager 828 can also indicate to scheduler 824 which computing resources are busy executing other applications. Configurator 830 can configure various computing resources using configuration script(s), e.g., as indicated by scheduler 824. For example, scheduler 824 can indicate to configurator 830 that a certain computing resource is to be configured using configuration script 822(1). Upon receiving such indications from scheduler 824, configurator 830 can reconfigure this computing resource using configuration script 822(1). For example, configurator 830 can configure an FPGA resource using a configuration script of FIG. 8E.

Below is a sample model, such as model 810 of FIG. 8A, that can be used to dynamically generate various scripts, such as control script(s) 818, job script(s) 820(1)-820(N), and/or configuration script(s) 822(1)-822(N).

```
# A model to dynamically generate job scripts
# number of cpus to use for sampe step – selected via pe_ncpus=8
ref=$1
seq1=$2
seq2=""
aln_jobname=${alnn1}${alnn2}bwa_aln
alnscript=${aln_jobname}_$$.sh
echo "#!/bin/sh" > $alnscript
echo "#$ PBS -mabe" >> $alnscript
echo "#$ PBS -Nbwa-aln" >> $alnscript
echo " " >> $alnscript
echo "echo \"/opt/convey/cnybwa/bin/cnybwa aln $alnopts $ref $seq1 -f $sai1\" " >> $alnscript
echo " " >> $alnscript
echo "echo \"--------------\" " >> $alnscript
if [ -n "$seq2" ] ; then
    echo " " >> $alnscript
    echo "echo \"/opt/convey/cnybwa/bin/cnybwa aln $alnopts $ref $seq2 -f $sai2\" " >> $alnscript
    echo " " >> $alnscript
    echo " " >> $alnscript
    echo "echo \"--------------\" " >> $alnscript
fi
echo " " >> $alnscript
if [ -n "$seq2" ] ; then
    sampe_jobname=${alnn1}${alnn2}bwa_sampe
else
    sampe_jobname=${alnn1}${alnn2}bwa_samse
fi
sampescript=${sampe_jobname}_$$. sh
echo "#!/bin/sh" > $sampescript
echo "#$ PBS -mabe" >> $sampescript
echo "#$ PBS -Nbwa-sampe" >> $sampescript
echo "#$ PBS -l gpus=1" >> $sampescript
echo " " >> $sampescript
echo "ncpus=$pe_ncpus" >> $sampescript
echo " " >> $sampescript
echo "echo \"--------------\" " >> $sampescript
echo " " >> $sampescript
if [ -n "$seq2" ] ; then
    echo "echo \"$bwa_path/bwa sampe -t \$ncpus $peopts $ref $sai1 $sai2 $seq1 $seq2 $samfile\"
" >> $sampescript
    echo " " >> $sampescript
else
    echo "echo \"$bwa_path/bwa samse -t \$ncpus $peopts $ref $sai1 $seq1 $samfile\ " >>
```

```
$sampescript
    echo " " >> $sampescript
    echo "time $bwa_path/bwa samse -t \$ncpus $peopts $ref $sai1 $seq1 $samfile" >>
$sampescript
    echo " " >> $sampescript
fi
echo "echo \"--------------\" " >> $sampescript
echo " " >> $sampescript
```

Using the model shown above and parameters from a request, workflow generator 814 dynamically generates various scripts. For example, one request parameter can indicate that a sampe job script (for a sampe operation) is to be generated. Also, the generated job script can indicate that a different version of a sampe operation (i.e., bwa_sampe or bwa_samse) is to be used, depending on value of another parameter (i.e., that indicates a type of the sampe operation). Similarly, the model above can be used to select a type and/or number of resources for execution of the sample operation. In the example above, type and number of CPU resources can be selected based on the parameters, such as an "ncpu" parameter, the "–n" parameter. In other implementations, the type of resource(s), on which the applications are to execute, can also be selected, such as FPGA(s), CPU(s), and/or GPU(s), among others.

FIGS. 8B-8F illustrate examples of scripts that are used by elements of FIG. 8A, according to some embodiments. FIG. 8B illustrates an example of a control script 840, such as control script 818. Control script 840 can be generated for a request for a two-step BWA operation. Control script 840 can be generated by workflow generator 814 based on the parameters and/or a model (e.g., model 810). Control script 840 can indicate, e.g., to scheduler 824, that a jobscript for a first BWA step 842 is to be executed first. Control script 840 can also indicate that a jobscript for a second BWA step 844 is to be executed next, upon successful execution of the first job script (i.e., by using the "afterok" element which is a conditional element, i.e., execute the second job script after the execution of the first job script is successful). Although not shown in FIG. 8B, control script 840 can also indicate that configuration script(s) are to be executed prior to execution of the first and/or second job scripts. Control script 840 can also indicate that any such configuration scripts are to be executed only as necessary.

FIGS. 8C and 8D illustrate example job scripts, according to some embodiments, according to one embodiment. FIG. 8C illustrates a job script 850 for a BWA align operation, according to one embodiment. Job script 850 includes references 852 to external data (such as data in data storage 832). Job script 850 can indicate location 854 of an application as well as of any other supporting files for that application. Job script 850 can also indicate what resource(s) to use. However, in some embodiments, the resource(s) to be used the application can be selected by scheduler 824 instead, such as based on the associated control script. Job script 850 can also indicate one or more outputs 856 (i.e., output files) that are created by execution of the application.

FIG. 8D illustrates a job script 860 for a BWA sampe operation, according to one embodiment. Job script can indicate what resource is to be used when executing a corresponding application (e.g., as indicated by elements 862). However, in some embodiments, the resource(s) to be used by the application can be selected by scheduler 824 instead. Job script 860 includes references 864 to external data (such as data in data storage 832). References 864 can include files generated by another job script, i.e., files 856 indicated by job script 850. Job script 860 can indicate location 866 of an application as well as of any other supporting files for that application. Job script 860 can also indicate one or more outputs 868 (i.e., output files) that are created by execution of the application.

FIG. 8E illustrates a configuration script 870, according to one embodiment. Configuration script 870 can be an implementation of configuration script 822(1). Configuration script 870 can include instructions to reconfigure a resource. In this case, configuration script 870 includes instructions to change a bit stream value of an FPGA resource (e.g., FPGA 704(1)). Configuration script 870 can be executed before execution of a job script (i.e., that indicates that an application is executed on such as FPGA resource). In one embodiment, configuration script 870 can reference one or more hardware description language (HDL) files (e.g., such as VHDL and/or Verilog) that can be used to configure an FPGA. In another embodiment, configuration script 870 can reference a configuration file that can reconfigure a GPU resource (e.g., by reconfiguring register(s) and/or operation mode(s) of this GPU resource).

Figure 8F:
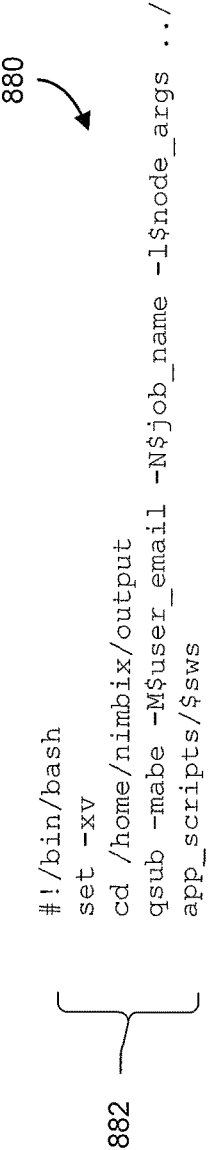

FIG. 8F illustrates another example of a control script 880, such as control script 818. Control script 880 can be generated for a request for a one-step SWS operation. Control script 880 can be generated by workflow generator 880 based on the parameters and/or a model (e.g., model 810). Control script 880 can indicate, e.g., to scheduler 824, that a jobscript for SWS operation 882 is to be executed. Control script 880 can also indicate that one or more configuration scripts can be executed.

Figure 9A:
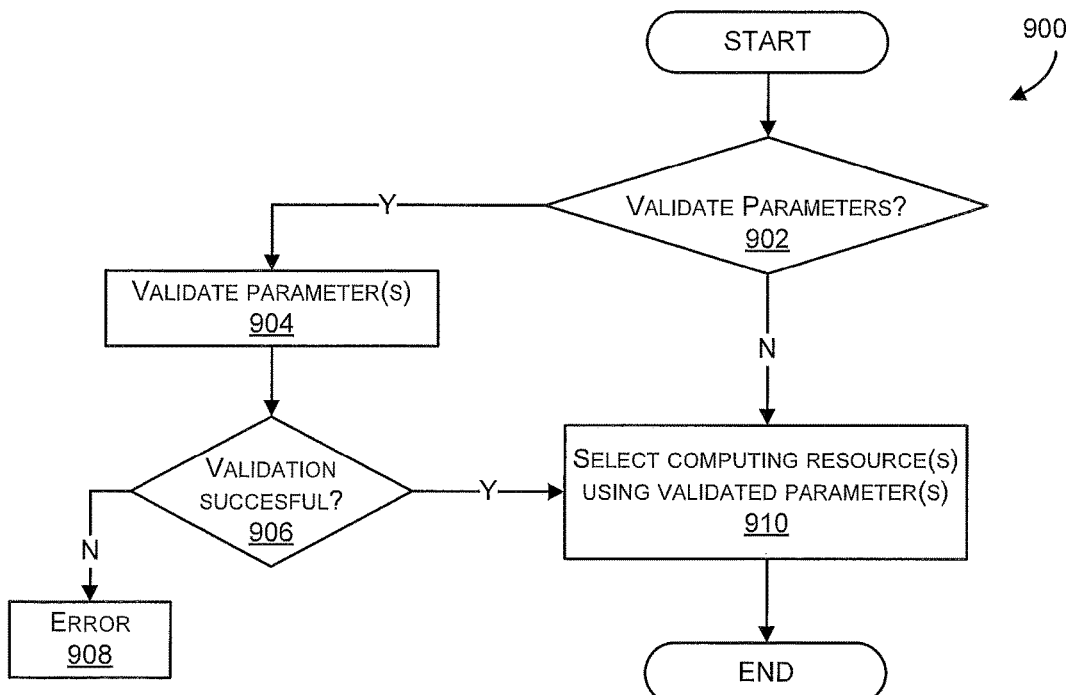
FIGS. 9A and 9B are flowcharts illustrating portion(s) of a method for using a distributed computing system, according to one embodiment.

FIG. 9A is a flowchart illustrating a method 900 for validating parameters, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 900 is described with reference to variations of the elements described in connection with FIGS. 1 and 8. In one embodiment, method 900 is implemented by parameter validator 808. In one embodiment, method 900 can be performed as a part of, or prior to, element 304 of method 300.

In element 902, a determination is made as to whether parameters should be validated, according to one embodiment. For example, parameter validator 808 can make this determination. If the determination indicates that parameters should not be validated, then method 900 executes element 910 next. If the determination indicates that the parameters should be validated, then method 900 executes element 904 next.

In element 904, parameters are validated, according to one embodiment. For example, parameter validator 808 can perform this validation. In one implementation, parameter validator 808 can determine whether the parameters (i.e., of the request) are in proper format (e.g., useable by model selector 804), contain a proper number of elements. In other words, this validation ensures that the model can be used to generate the various scripts, and/or that the parameters are sufficient for the selected application for proper execution.

In element 906, a determination is made as to whether the validation was successful, according to one embodiment. For example, parameter validator 808 can perform this determination. If the determination indicates that the validation was successful, then method 900 executes element 910 next. If the determination indicates that the validation was not successful, then method 900 executes element 908 next. In element 908, an error condition may be raised, such as by server module 114. Upon such an error condition, further processing of the request is not performed, and instead server module 114 can send an indication of this error to the client that initiated this request.

In element 910, computing resources are selected using the validated parameter(s). For example, server module 114 can perform this element. In one embodiment, element 910 is a variation of element 304, i.e., the computing resources are selected using parameters that have been either validated by element 906, or selected using non-validated parameters if the parameters do not need to be validated.

Figure 9B:
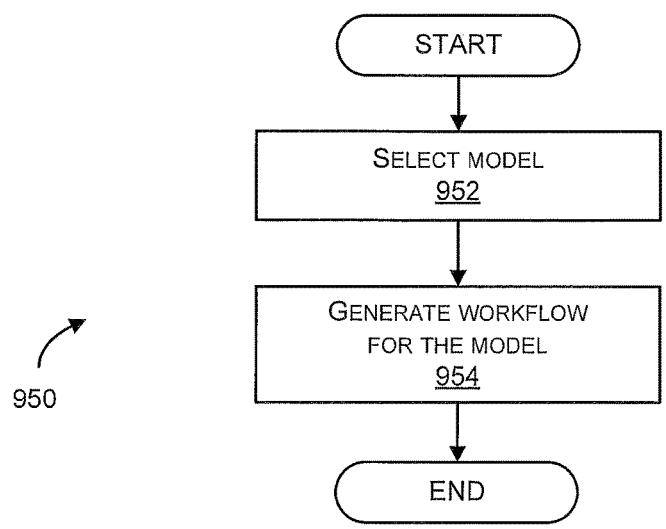

FIG. 9B is a flowchart illustrating a method 950 for generating scripts from a model, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 950 is described with reference to variations of the elements described in connection with FIGS. 1 and 8. In one embodiment, method 950 is implemented by workflow generator 814. In one embodiment, method 950 can be performed as a part of element 306 of method 300.

In element 952, a model is selected. For example, model selector 804 can select a model for an application based on the parameters. Each model can describe the operations, requirements, etc., of each application that can be executed using the computing resources. It is noted that the actual application is implemented by the nodes, including at least parts of such applications by the computing resources.

In element 954, the workflow is generated for the selected model. For example, workflow generator 814 generates workflow 816. Such workflow can include control script(s), job script(s), and configuration script(s). Workflow generator 814 can generate such a workflow based on input(s) as well as any indications and determinations made by a resource selector, in addition to the selected model. Examples of model and script generation using selected model(s) are described above with reference to FIGS. 8A-8F.

Figure 10:
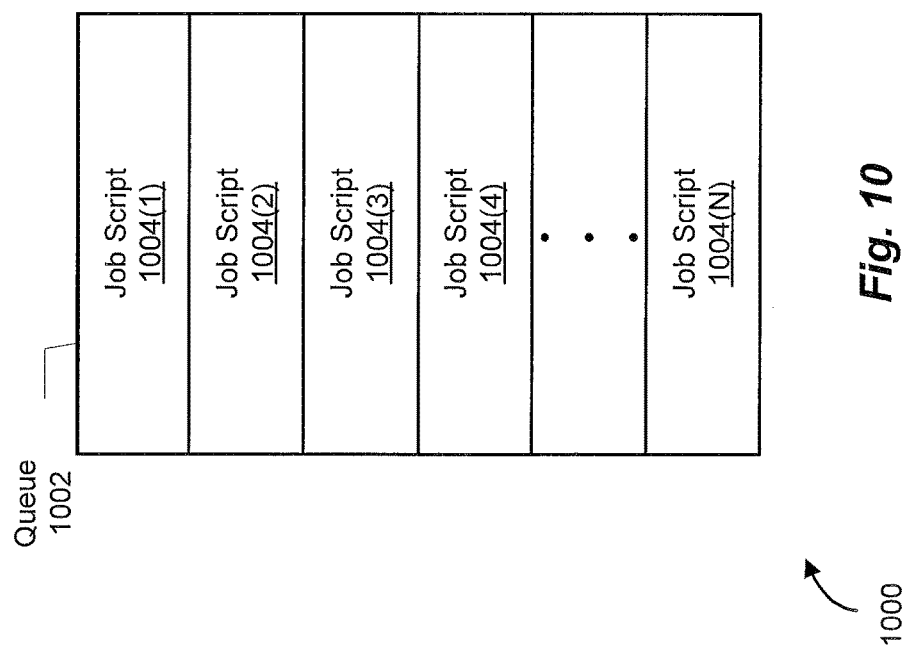
FIG. 10 is a block diagram of a job queue, according to one embodiment.

FIG. 10A is a block diagram 1000 illustrating a queue 1002, according to one embodiment. In one embodiment, queue 1002 can be an implementation of queue 826. Queue 1002 can be implemented as a part of, or externally to, the scheduler. Queue 1002 stores various elements of a workflow, such as job scripts. The order of access to these job scripts can be controlled by scheduler 824. In one embodiment, a job script is executed when it is accessed by the scheduler. In another embodiment, a job script may contain instructions (i.e., that can be used by the scheduler) on how to execute an application.

Queue 1002 illustrates multiple job scripts 1004(1)-1004 (N). These job scripts 1004(1)-1004(N) can correspond to workflows for various requests. For example, both job script 1004(1) and 1004(2) can correspond to a single request to perform gene sequence analysis operations on a certain data set. Job script 1004(1) is thus generated (e.g., by workflow generator 814) to perform a BWA align operation on this data. Job script 1004(2) is also generated to perform a SAM function on the result of the BWA align operation. An associated control script, such as control script 818, indicates to scheduler 824 that job script 1004(2) depends on the execution of job script 1004(1). The other job scripts 1004 (3)-1004(N) can be associated with other request(s).

FIG. 11 is a block diagram 1100 illustrating execution of an application using one or more computing resources, according to one or more embodiments. FIG. 11 illustrates execution of a job script, such as job script 1004(1). This job script can indicate the application that is to be executed, the computing resources to use, data 1102(1)-1102(N) is provided to computing resources 1104(1)-1104(N), as well as to application 1106. It is noted that application 1106 can execute using computing resources 1104(1)-1104(N), and as such, the execution paradigm may vary depending on the type of computing resources 1104(1)-1104(N). After application 1106 executes, computing resources 1104(1)-1104(N) can then return result(s) 1108 of the execution of application 1106.

For example, for FPGA computing resources 1104(1)-1104(N), each FPGA can be re-configured (e.g., using a configuration script for the relevant request) in order to facilitate execution of application 1106. For example, this configuration script can configure FPGA computing resources 1104(1)-1104(N) with at least portions of application 1106 (e.g., with certain functions of application 1106 that can be executed in parallel by multiple FPGAs). The remaining portion of application 1106 can execute on the node(s) that contain these FPGAs. An example configuration script is described above with reference to FIG. 8E, and example operation of using such a configuration script is described below with reference to FIG. 12, among others.

For example, for GPU computing resources 1104(1)-1104 (N), each GPU can also be re-configured (e.g., using a configuration script for the relevant request) in order to facilitate execution of application 1106. For example, this configuration script can configure GPU computing resources 1104(1)-1104(N) with various parameters for application 1106. GPU computing resources 1104(1)-1104(N) can then execute application 1106.

Figure 12:
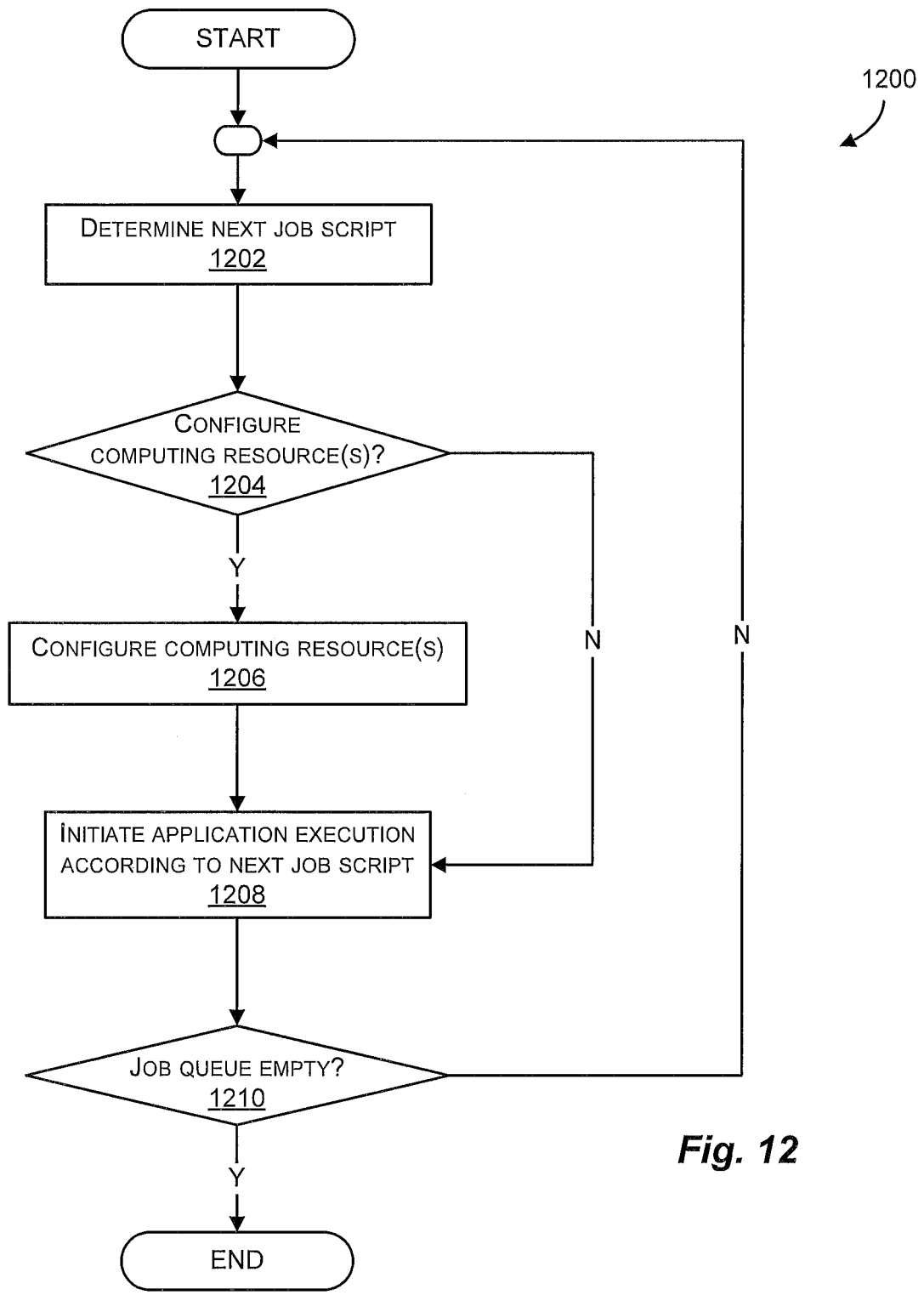
FIG. 12 is a flowchart illustrating a method for scheduling of a next job, according to one embodiment.

FIG. 12 is a flowchart illustrating a method 1200 for operation of a scheduler, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 1200 is described with reference to variations of the elements described in connection with FIGS. 1 and 8. In one embodiment, method 1200 is implemented by scheduler 824. In one embodiment, method 1200 can be performed as a part of, or prior to, elements 308 of method 300 and 408 of method 400.

In element 1202, a next job script is determined, according to one embodiment. For example, the scheduler can determine that the next job script is job script 1004(1) from queue 1002. In another embodiment, the scheduler can determine a different next job script, such as job script 1004(3). The scheduler can select the next job script based on various parameters, as described below with reference to FIG. 13.

In element 1204, a determination is made as to whether the computing resource(s) should be configured. For example, the scheduler can make this determination based on the control script associated with the selected job script, on the requirements specified in the job script, and/or on a current state of the determined computing resource(s). In other words, the scheduler can configure certain computing resource(s) as indicated by the control script. The resource manager can also indicate to the scheduler which computing resources are busy executing other applications. The scheduler would then determine to use/configure computing resources that are not busy executing other applications.

In element 1206, the computing resource(s) are configured. For example, the determined computing resource(s) are configured by configurator 830 if element 1204 determines that the computing resource(s) should be configured. In one embodiment, configurator 830 can execute a configuration script (i.e., that is associated with the selected job script/part of a current workflow). In another embodiment, configurator 830 can execute configuration file(s) referenced by the configuration script(s) (e.g., that are associated with the selected job script). The type of these configuration files(s) may vary depending on the type of computing resource(s) being configured. An example configuration script is described above with reference to FIG. 8E, among others.

In element 1208, execution of an application is initiated according to the next job script. For example, the scheduler can initiate execution of the application according to the selected job script (and, optionally, the associated control script). The execution of the application is described more fully above with reference to FIG. 11.

In element 1210, a determination is made as to whether the job queue is empty. The scheduler can make this determination. If the job queue is not empty, then element 1202 is performed next. If the job queue is empty, then method 1200 can end (or pause until the next job script in placed in the queue).

Figure 13:
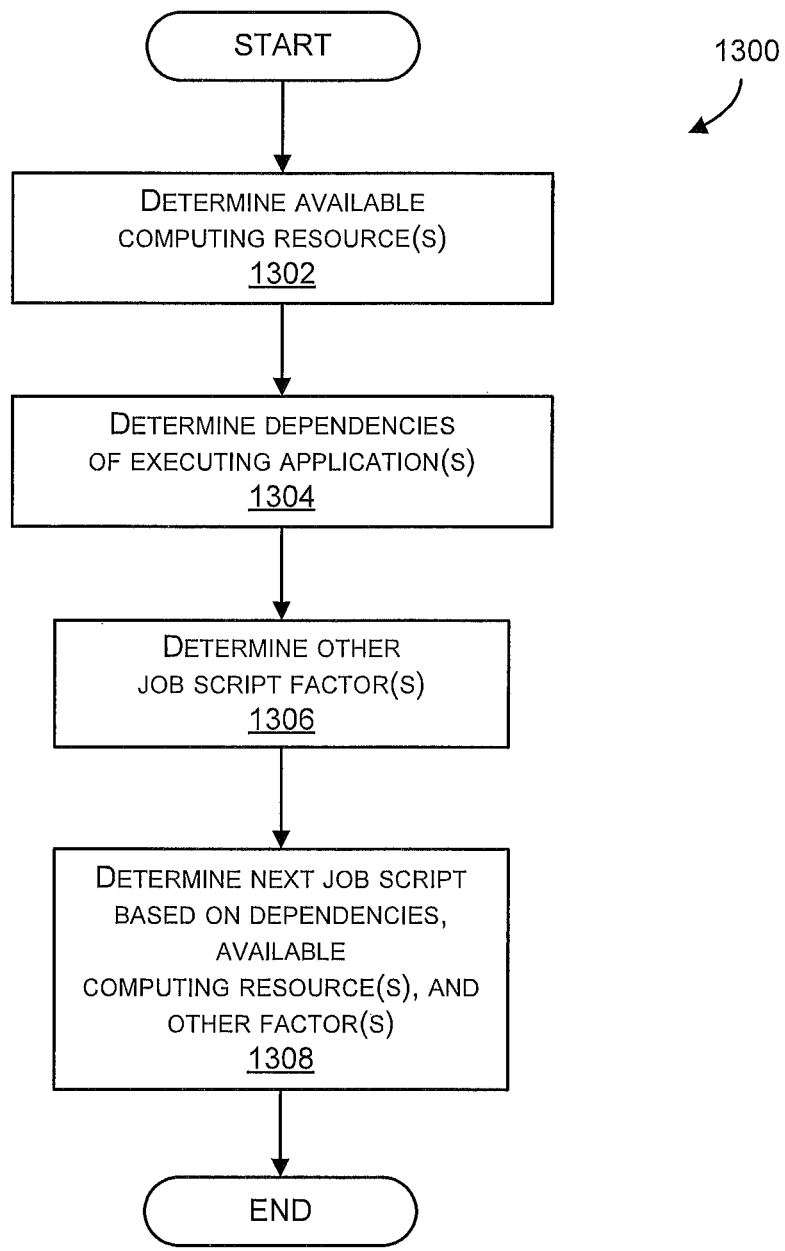
FIG. 13 is flowchart illustrating a method for determining a next job script, according to one embodiment.

FIG. 13 is a flowchart illustrating a method 1300 for determining a next job script, according to one or more embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 1300 is described with reference to variations of the elements described in connection with FIGS. 1 and 8. In one embodiment, method 1300 is implemented by scheduler 824. In one embodiment, method 1300 can be performed as a part of element 1202 of method 1200.

In element 1302, available computing resources are determined, according to one embodiment. For example, the scheduler can examine whether the workflow (e.g., job script(s) and/or associated control script) indicates what computing resource(s) to use for execution of the application associated with the next job script. For example, the determined computing resource(s) (e.g., determined in element 302) can be used, at the time of this determination, to execute another application, may be in the process of being re-configured, and/or maybe unavailable for another reason. If the determination indicates that the determined computing resource(s) are unavailable, method 1100 executes element 1102 next. During the next execution of element 1102, the method 1100 may keep track of which computing resources are unavailable.

In element 1304, dependencies of executing application(s) are determined, according to one embodiment. Specifically, the scheduler can determine the dependencies of applications that are currently executing. Each application can correspond to a certain job script. However, some workflows can include multiple job scripts, and thus each such workflow can be associated with multiple different applications. For example, as described in some of the examples above, a single workflow can include a job script for a BWA align operation, and another job script for a SAM function. In this case, even if a job script for the SAM function was queued right after the job script for the BWA align operation, the scheduler would determine the dependency of the executing job (e.g., the BWA application corresponding to that certain script), and may select a different job script.

In element 1306, other job script factor(s) are determined, according to one embodiment. These job script factors may include projected node loads (i.e., for nodes that include the computing resources), priority of each job script in the queue (i.e., where each job script can have an associated priority, and a higher priority indicates that the associated job script is to be executed prior to the lower priority job script(s)), projected time of execution of each application that is already executing, projected time of execution of each application to be executed (i.e., application(s) associated with the job scripts in the queue), among others. In one embodiment, the other factors can include the amount of times resource(s) would need to be reconfigured. For example, if job scripts A, B, and C are queued in this order, all reference a first resource, all three job scripts indicate a reconfiguration of this resource, and the reconfiguration for job scripts A and C are the same, then these other factors may be used. As a result, job scripts A and C are executed and then job B, which would only require one reconfiguration before job scripts A and C and then another reconfiguration before job script B, instead of three reconfigurations (i.e., one before each job script).

In element 1308, the next job script is determined based on the available computing resources, dependencies of these available computing resources, and/or other job script factors, among others. In element 1208, the scheduler initiates an application associated with this next job script. In the example above, since the SAM application depends on the execution of the BWA application, another job script can be determined that corresponds to another application being executed.

Figure 14:
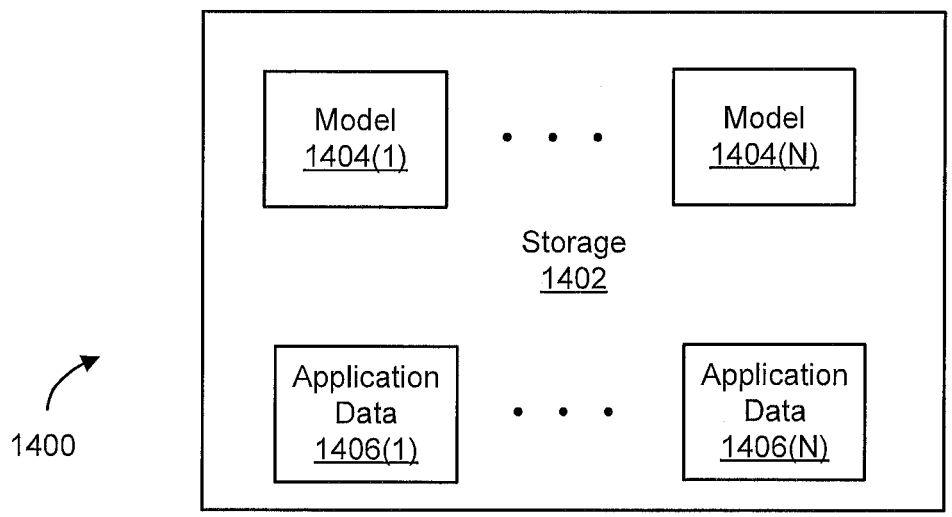
FIG. 14 is a block diagram illustrating various components of a storage element, according to one embodiment.

FIG. 14 is a more detailed block diagram 1400 of a storage 1402, according to one embodiment, such as storage 108 described in FIG. 1. It is noted that in some embodiments, one or more of elements of storage 1402 may not be used. In one embodiment, storage 1402 includes one or more model(s) 1404(1)-1404(N) and application data 1406(1)-1406(N). Model(s) 1404(1)-1404(N) can be associated with one or more applications. The model is selected, such as by a model selector, during workflow generation. Each model can include templates on how to generate various scripts that indicate how to execute each application, one or more computing resource(s) where each such application can be executed, and/or how to configure any such computing resource(s), among others. In one embodiment, application data 1406(1)-1406(N) can include at least portions of each application. For example, application data 1406(1)-1406(N) can include certain functions and/or instructions that can be used during workflow generation, e.g., that can be included in the configuration script(s). In this implementation, the configuration script can configure the computing resource with such function/instructions that can be executed during execution of such application.

Figure 15:
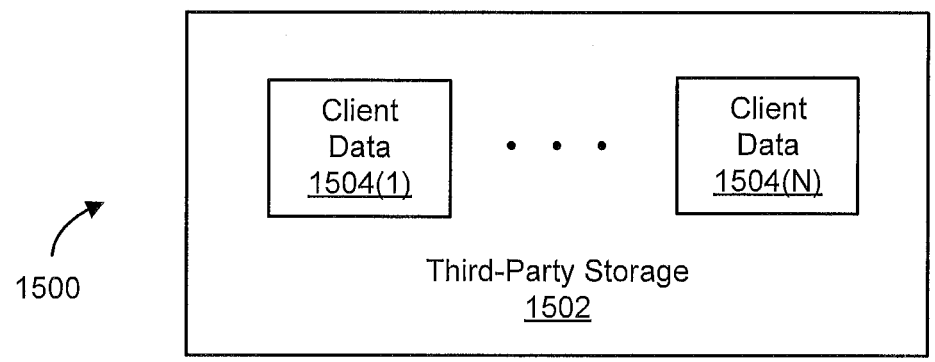
FIG. 15 is a block diagram illustrating various components of a third-party storage element, according to one embodiment.

FIG. 15 is a more detailed block diagram 1500 of third-party storage 1502, according to one embodiment, such as third-party storage 110 described in FIG. 1. It is noted that in some embodiments, one or more of elements of third-party storage 1502 may not be used. In one embodiment, third-party storage 1502 includes client data 1504(1)-1504(N). Client data 1504(1)-1504(N) can be associated with clients 102(1)-102(N). Client data 1504(1)-1504(N) can include various data that is to be processed during application execution, as indicated by the parameters. For example, client 102(1) can store client data 1504(1) using third-party storage 1502. A request from client 102(1) can indicate to perform a BWA align operation on client data 1504(1) and then a SAM function operation on the result from this BWA align operation.

Figure 16:
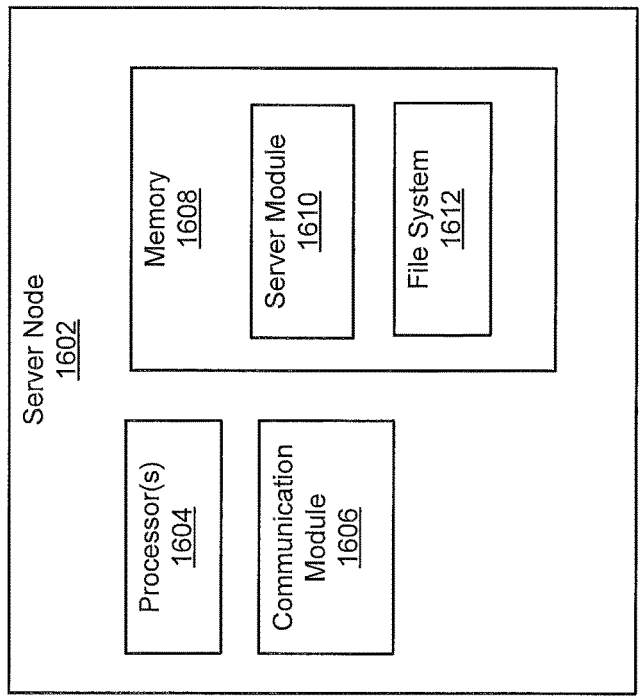
FIG. 16 is a block diagram illustrating various components of a server node, according to one embodiment.

FIG. 16 is a block diagram 1600 of a server node 1602, such as server 104, as described in FIG. 1, among others. Server node 1602 includes one or more processor(s) 1604, a communication module 1606, and memory 1608. It is noted that is some embodiments, one or more of these elements may be combined. Memory 1608 includes server module 1610 and file system 1612. Server module 1610 can be an implementation of server module 114. It is also noted that server module 1610 may be implemented as a software and/or hardware module. It is also noted that in some embodiments one or more of elements of server node 1602 may not be used. Communication module 1606 can facilitate communication of server node 1602 with the client(s), the node(s), and/or various storage system(s). Processor(s) 1604 can execute one or more of server module 1610 and/or file system 1612. Server module 1610 can implement at least portions of methods 200, 300, 500, 900, 950, 1200, and/or 1300.

Figure 17:
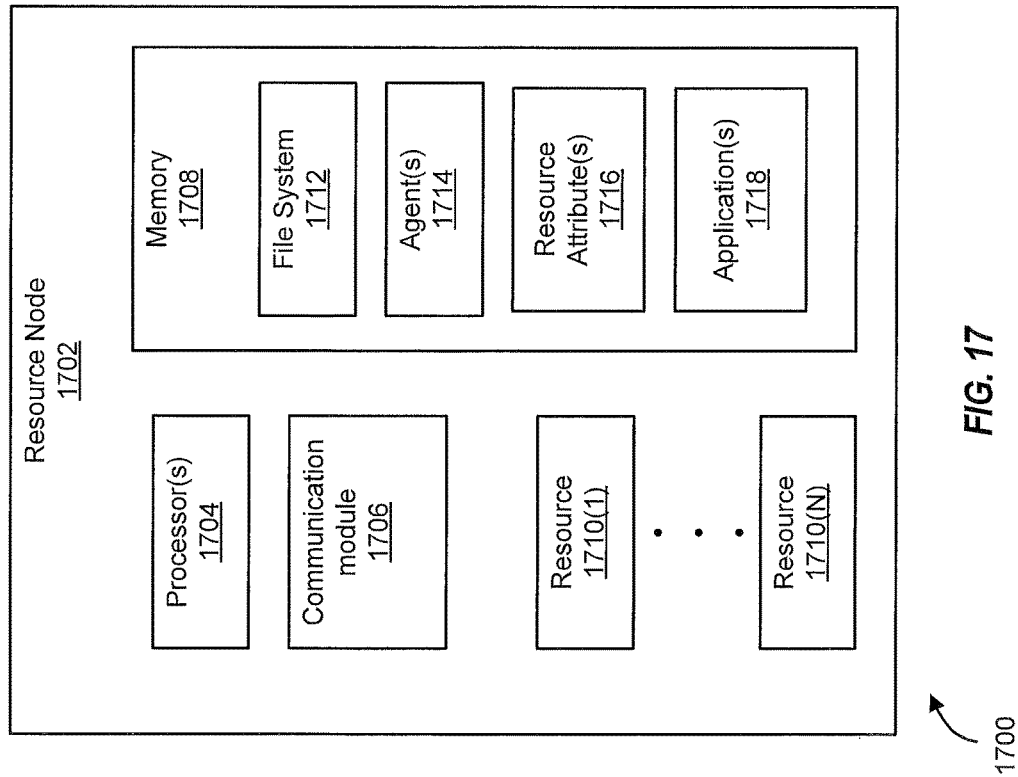
FIG. 17 is a block diagram illustrating various components of a resource node, according to one embodiment.

FIG. 17 is a block diagram of a resource node 1702, such as nodes 112(1)-112(N) and/or nodes 702, 722, 742. Resource node 1100 includes one or more processor(s) 1704, a communication module 1706, memory 1708, and one or more resource(s) 1710(1)-1710(N). It is noted that is some embodiments, one or more of these elements may be combined. Memory 1708 includes file system 1712, one or more agents 1714, one or more resource attributes 1716, and one or more applications 1718. It is also noted that various modules of resource node 1702 may be implemented as a software and/or hardware module(s). It is also noted that in some embodiments one or more of elements of resource node 1702 may not be used. Communication module 1706 can facilitate communication of resource node 1702 with the server, other node(s), and/or various storage system(s). Processor(s) 1704 can execute one or more of file system 1612, agent(s) 1714, and/or one or more applications 1718. Resource(s) 1710(1)-1710(N) can be implementations of resources 704(1)-704(N), 724(1)-724(N), 744(1)-744(N), and/or 1104(1)-1104(N). Application(s) 1718 can be implementation(s) of application 1106. Agent(s) can include one or more elements of (and/or portions of) the scheduler, resource manager, and/or configurator.

Elements of network architecture can be implemented using different computer systems and networks. An example of one such network environment is described below with reference to FIG. 18.

Figure 18:
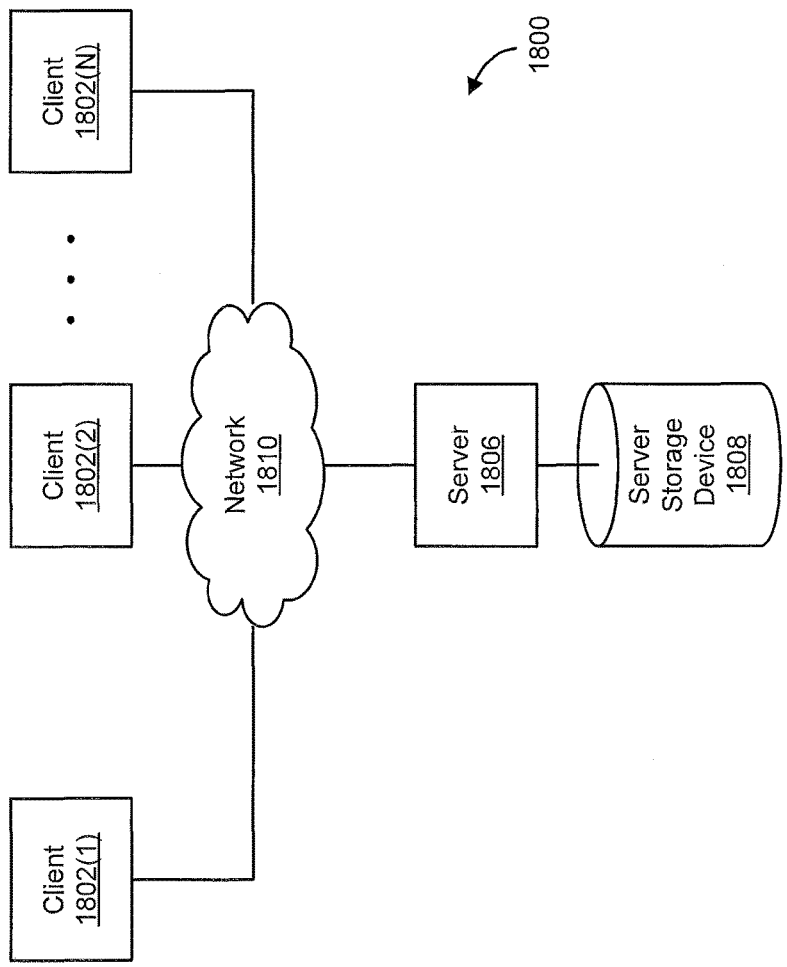
FIG. 18 is a block diagram illustrating a network architecture in which an embodiment of the present invention can be implemented.

FIG. 18 is a simplified block diagram illustrating a network architecture 1800 in which one or more clients are provided with access to a server via various network connections. As depicted in FIG. 18, clients 1802(1)-(N) are coupled to a network 1810 (which can be used to implement network 106A and/or 106B), and so are able to access a server 1806 (which can be used to implement server 104 and/or node(s) 112(1)-112(N)) via network 1810. Other servers (not shown) can be used instead to implement server 104). A client can be implemented using, for example, a desktop computer, a laptop computer, a workstation, a server, a cell phone, a smart phone, a network-enabled personal digital assistant (PDA), or the like. An example of network 1810, which can be used by clients 1802(1)-(N) to access server 1806, is the Internet. Alternatively, access to server 1806 can be provided by a local area network (LAN) utilizing Ethernet, IEEE 802.11x, or some other communications protocol. As will be appreciated, server 1806 can be accessed by clients coupled directly thereto (not shown).

As also depicted on FIG. 18, server 1806 is coupled to a server storage device 1808, which includes a data volume such as cluster shared volume. Server storage device 1808 can be implemented as a single storage device or a collection of storage devices. Server storage device 1808 can also be implemented as a storage area network, which couples remote storage devices to a server (e.g., server 1806), such that the remote storage devices appear as locally-attached storage devices to the server's OS, for example.

In light of the present disclosure, those of skill in the art will appreciate that server storage device 1808 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 1800 can include other components such as routers, firewalls and the like that are not germane to the discussion of the present network and will not be discussed further herein. Those of skill in the art will also appreciate that other configurations are possible. For example, clients 1802(1)-(N) can be directly coupled to server storage device 1808 without the user of a server or Internet; server 1806 can be used to implement both the clients and the server; network architecture 1800 can be implemented without the use of clients 1802(1)-(N); and so on.

As an example implementation of network architecture 1800, server 1806 (implemented with a server 104) services requests to data generated by clients 1802(1)-(N) to data stored in server storage device 1808 (implemented with third-party storage 110). Other servers (not depicted) can be implemented with server 104. A server module (e.g., server module 114) can be implemented using one of the other servers in the manner illustrated by FIGS. 2, 3, 5, 8, 9B, 12, and/or 13.

Figure 19:
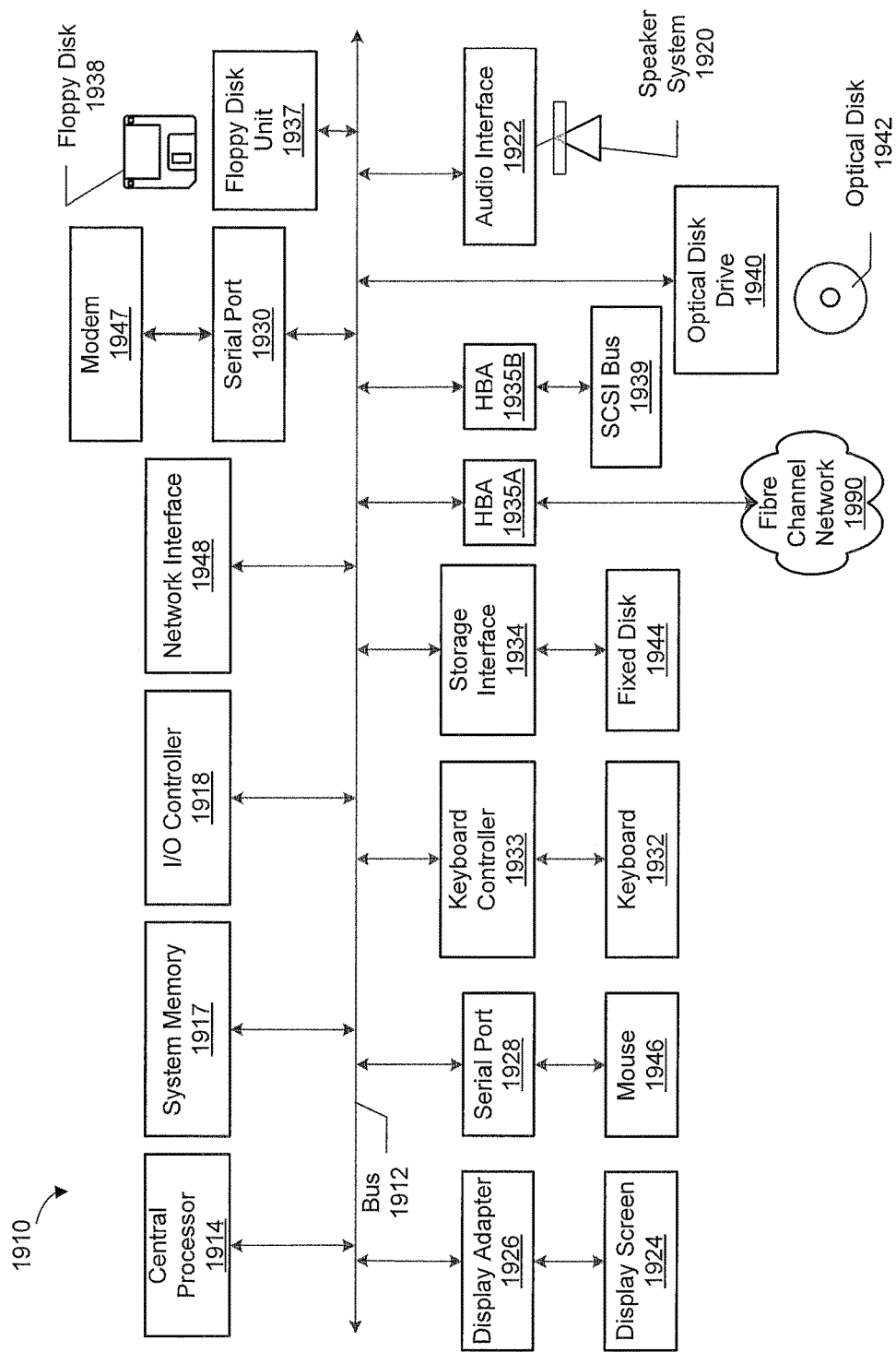
FIG. 19 is a block diagram that illustrates an example of a computer system suitable for implementing embodiments of the present invention.

FIG. 19 depicts a block diagram of a computer system 1910 suitable for implementing the present disclosure. Computer system 1910 may be illustrative of various computer systems in distributed computing system 100, such as server(s) 104 or nodes 112(1)-112(N), among others. Computer system 1910 includes a bus 1912 which interconnects major subsystems of computer system 1910, such as a central processor 1914, a system memory 1917 (typically RAM, but which may also include ROM, flash RAM, or the like), an input/output controller 1918, an external audio device, such as a speaker system 1920 via an audio output interface 1922, an external device, such as a display screen 1924 via display adapter 1926, serial ports 1928 and 1930, a keyboard 1932 (interfaced with a keyboard controller 1933), a storage interface 1934, a floppy disk drive 1937 operative to receive a floppy disk 1938, a host bus adapter (HBA) interface card 1935A operative to connect with a Fibre Channel network 1990, a host bus adapter (HBA) interface card 1935B operative to connect to a SCSI bus 1939, and an optical disk drive 1940 operative to receive an optical disk 1942. Also included are a mouse 1946 (or other point-and-click device, coupled to bus 1912 via serial port 1928), a modem 1947 (coupled to bus 1912 via serial port 1930), and a network interface 1948 (coupled directly to bus 1912).

Bus 1912 allows data communication between central processor 1914 and system memory 1917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1910 are generally stored on and accessed via a computer readable medium, such as a hard disk drive (e.g., fixed disk 1944), an optical drive (e.g., optical drive 1940), a floppy disk unit 1937, or other storage medium. Additionally, applications can be in the form of electronic signals modulated in accordance with the application and data communication technology when accessed via network modem 1947 or interface 1948.

Storage interface 1934, as with the other storage interfaces of computer system 1910, can connect to a standard computer readable medium for storage and/or retrieval of information, such as a fixed disk drive 1944. Fixed disk drive 1944 may be a part of computer system 1910 or may be separate and accessed through other interface systems. Modem 1947 may provide a direct connection to a remote server via a telephone link or to the Internet via an internet service provider (ISP). Network interface 1948 may provide a direct connection to a remote server via a direct network link to the Internet via a POP (point of presence). Network interface 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the present disclosure. The devices and subsystems can be interconnected in different ways from that shown in FIG. 19. The operation of a computer system such as that shown in FIG. 19 is readily known in the art and is not discussed in detail in this application. Code for server module 114, agent(s) used by node(s) 112(1)-112(N) and/or for providing use of a distributed computing system (such as described above with reference to methods 200, 300, 400, 500, 900, 950, 1200, and/or 1300, and/or the block diagrams 800 and/or 1100), etc., to implement the present disclosure can be stored in computer-readable storage media such as one or more of system memory 1917, fixed disk 1944, optical disk 1942, or floppy disk 1938. Memory 1920 is also used for storing temporary variables or other intermediate information during the execution of instructions by the processor 1910. The operating system provided on computer system 1910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   identifying a first application to be executed;
   configuring a computing node in a first configuration, wherein
      the computing node comprises a plurality of computing resources,
      the configuring the computing node in the first configuration comprises
         configuring a first computing resource of the plurality of computing resources to execute at least a portion of the first application according to a first workflow, and
         configuring a second computing resource of the plurality of computing resources to execute at least another portion of the first application according to the first workflow,
      the first computing resource is of a first type of a plurality of types of computing resources, and
      the second computing resource is of a second type of the plurality of types of computing resources;
   executing, according to the first workflow, the at least the portion of the first application and the at least the another portion of the first application;
   identifying a second application to be executed;

configuring the computing node in a second configuration, wherein
the configuring the computing node in the second configuration comprises
configuring the first computing resource to execute at least a portion of the second application according to a second workflow, and
configuring the second computing resource to execute at least another portion of the second application according to the second workflow; and
executing, according to the second workflow, the at least the portion of the second application and the at least the another portion of the second application.

2. The method of claim 1, wherein
the configuring the computing node in the first configuration further comprises
selecting a first computing resource of the plurality of computing resources, and
selecting a second computing resource of the plurality of computing resources, and
the configuring the computing node in the second configuration further comprises
selecting the first computing resource, and
selecting the second computing resource.

3. The method of claim 2, wherein
the first workflow and the second workflow are different portions of a single workflow.

4. The method of claim 2, wherein
receiving the at least the portion of the first workflow at the computing node, wherein
the at least the portion of the first workflow comprises a first plurality of scripts;
accessing a first configuration file, wherein
the first plurality of scripts references the first configuration file, and
the first computing resource is configured in the first configuration based on configuration information in the first configuration file;
receiving the at least the portion of the second workflow at the computing node, wherein
the at least the portion of the first workflow comprises a second plurality of scripts; and
accessing a second configuration file, wherein
the second plurality of scripts references the second configuration file, and
the second computing resource is configured in the second configuration based on configuration information in the second configuration file.

5. The method of claim 4, further comprising:
identifying a first job script, wherein
the first plurality of scripts comprises the first job script, and
the first job script identifies the at least the portion of the first application, the first computing resource, and a first configuration script;
identifying a second job script, wherein
the second plurality of scripts comprises the second job script, and
the second job script identifies the at least the portion of the second application, the first computing resource, and a second configuration script; and
accessing at least one control script, wherein
the at least one control script indicates that the first job script is to be executed before the second job script,
the at least one control script indicates that the first computing resource is to be configured in the first configuration prior to executing the at least the portion of the first application, and
the at least one control script indicates that the first computing resource is to be configured in the second configuration prior to executing the at least the portion of the second application.

6. The method of claim 1, wherein
the first computing resource comprises a reconfigurable logic device, and
the first computing resource is selected to execute the at least the portion of the first application by
determining that one or more attributes of the reconfigurable logic device satisfy a resource requirement for the at least the portion of the first application, and
determining that the reconfigurable logic device can be configured to execute the at least the portion of the first application according to the first workflow, prior to executing the at least the portion of the first application.

7. The method of claim 6, wherein
the reconfigurable logic device is a field-programmable gate array (FPGA), and
the configuring the first computing resource according to the first workflow comprises
changing a bit stream of the FPGA.

8. The method of claim 1, wherein
the first computing resource comprises a graphics processing unit (GPU), and
the first computing resource is selected to execute the at least the portion of the first application by
determining that one or more attributes of the GPU satisfy a resource requirement for the at least the portion of the first application, and
determining that the GPU can be configured to execute the at least the portion of the first application according to the first workflow, prior to executing the at least the portion of the first application.

9. The method of claim 8, wherein
the configuring the first computing resource according to the first workflow comprises
reconfiguring one or more registers of the GPU and/or changing an operation mode of the GPU.

10. The method of claim 1, wherein
the plurality of types of computing resources comprises at least one of
a field-programmable gate array (FPGA),
a graphics processing unit (GPU),
a digital signal processor (DSP), or
a central processing unit (CPU).

11. The method of claim 1, wherein
the at least the portion of the first application and the at least another portion of the first application are different portions of the first application.

12. A system comprising:
a computing node, wherein
the computing node comprises
a plurality of computing resources,
a computer-readable storage medium, coupled to the plurality of computing resources,
a configurator, stored in the computer-readable storage medium, and
a resource manager, stored in the computer-readable storage medium,
the configurator is configured to
identify a first application to be executed,
configure the computing node in a first configuration by virtue of being configured to
configure a first computing resource of the plurality of computing resources to execute at least a portion of the first application according to a first workflow, and
configure a second computing resource of the plurality of computing resources to execute at least another portion of the first application according to the first workflow,
the first computing resource is of a first type of a plurality of types of computing resources, and
the second computing resource is of a second type of the plurality of types of computing resources,
the resource manager is configured to
cause execution, according to the first workflow, of the at least the portion of the first application and the at least the another portion of the first application,
the configurator is further configured to
identify a second application to be executed, and
configure the computing node in a second configuration, wherein
the computing node is configured in the second configuration by virtue of being configured to
configure the first computing resource to execute at least a portion of the second application according to a second workflow,
configure the second computing resource to execute at least another portion of the second application according to the second workflow, and
the resource manager is further configured to
cause execution of the at least the portion of the second application and the at least the another portion of the second application.

13. The system of claim 12, wherein
the configurator is further configured to
configure the computing node in the first configuration by virtue of being further configured to
select the first computing resource, and
select the second computing resource, and
configure the computing node in the second configuration by virtue of being further configured to
select the first computing resource, and
select the second computing resource.

14. The system of claim 13, wherein the computing node is configured to:
receive the at least the portion of the first workflow at the computing node, wherein
the at least the portion of the first workflow comprises a first plurality of scripts;
access a first configuration file, wherein
the first plurality of scripts references the first configuration file, and
the first computing resource is configured in the first configuration based on configuration information in the first configuration file;
receive the at least the portion of the second workflow at the computing node, wherein
the at least the portion of the second workflow comprises
a second plurality of scripts;
access a second configuration file, wherein
the second plurality of scripts references the second configuration file, and
the second computing resource is configured in the second configuration based on configuration information in the second configuration file;
identify a first job script, wherein
the first plurality of scripts comprises the first job script, and
the first job script identifies the at least the portion of the first application, the first computing resource, and a first configuration script;
identify a second job script, wherein
the second plurality of scripts comprises the second job script, and
the second job script identifies at least one portion of the second application, the first computing resource, and a second configuration script; and
access at least one control script, wherein
the at least one control script indicates that the first job script is to be executed before the second job script,
the at least one control script indicates that the first computing resource is to be configured in the first configuration prior to executing the at least one portion of the first application, and
the at least one control script indicates that the first computing resource is to be configured in the second configuration prior to executing the at least one portion of the second application.

15. The system of claim 12, wherein
the first computing resource comprises a reconfigurable logic device, and
the first computing resource is selected to execute the at least the portion of the first application by
determining that one or more attributes of the reconfigurable logic device satisfy a resource requirement for the at least the portion of the first application, and
determining that the reconfigurable logic device can be configured to execute the at least the portion of the first application according to the first workflow, prior to executing the at least the portion of the first application.

16. The system of claim 15, wherein
the reconfigurable logic device is a field-programmable gate array (FPGA), and
the configurator is configured to configure the first computing resource according to the first workflow by virtue of being configured to
change a bit stream of the FPGA.

17. The system of claim 12, wherein
the first computing resource comprises a graphics processing units (GPU),
the GPU is selected to execute at least one portion of the first application by
determining that attributes of the GPU satisfy a resource requirement for the at least one portion of the first application, and
determining that the GPU can be configured in the first configuration prior to executing the at least one portion of the first application, and
the configurator is configured to configure the GPU in the second configuration by reconfiguring one or more registers of the GPU and/or changing an operation mode of the GPU.

18. A computer program product comprising:
a plurality of instructions, that, when executed by a hardware processor of a computer system, are configured to cause the hardware processor to identify a first application to be executed,
configure a computing node in a first configuration, wherein
the computing node comprises a plurality of computing resources,
the instructions configured to cause the hardware processor to configure the computing node in the first configuration comprise a plurality of instructions configured to
configure a first computing resource of the plurality of computing resources to execute at least a portion of the first application according to a first workflow, and configure a second computing resource of the plurality of computing resources to execute at least another portion of the first application according to the first workflow,
the first computing resource is of a first type of a plurality of types of computing resources, and
the second computing resource is of a second type of the plurality of types of computing resources,
execute, according to the first workflow, the at least the portion of the first application and the at least another portion of the first application,
identify a second application to be executed,
configure the computing node in a second configuration by virtue of being further configured to
configure the first computing resource to execute at least a portion of the second application according to a second workflow, and
configure the second computing resource to execute at least another portion of the second application according to the second workflow
execute, according to the second workflow, the at least the portion of the second application and the at least the another portion of the second application; and
a non-transitory computer-readable storage medium, wherein the instructions are encoded in the non-transitory computer-readable storage medium.

19. The computer program product of claim 18, wherein the plurality of instructions are further configured to
configure the computing node in the first configuration are further configured to
select a first computing resource of the plurality of computing resources, and
select a second computing resource of the plurality of computing resources, and
the plurality of instructions are further configured to configure the computing node in the second configuration are further configured to
select the first computing resource, and
select the second computing resource.

20. The computer program product of claim 19, wherein the plurality of instructions are further configured to:
receive the at least the portion of the first workflow at the computing node, wherein
the at least the portion of the first workflow comprises
a first plurality of scripts;
access a first configuration file, wherein
the first plurality of scripts references the first configuration file, and
the first computing resource is configured in the first configuration based on configuration information in the first configuration file;
receive the at least the portion of the second workflow at the computing node, wherein
the at least the portion of the first workflow comprises
a second plurality of scripts;
access a second configuration file, wherein
the second plurality of scripts references the second configuration file, and
the second computing resource is configured in the second configuration based on configuration information in the second configuration file;
identify a first job script, wherein
the first plurality of scripts comprises the first job script, and
the first job script identifies at least one portion of the first application, the first computing resource, and a first configuration script;
identify a second job script, wherein
the second plurality of scripts comprises the second job script, and
the second job script identifies the at least one portion of the second application, the first computing resource, and a second configuration script; and
access at least one control script, wherein
the at least one control script indicates that the first job script is to be executed before the second job script,
the at least one control script indicates that the first computing resource is to be configured in the first configuration prior to executing the at least one portion of the first application, and
the at least one control script indicates that the first computing resource is to be configured in the second configuration prior to executing the at least one portion of the second application.

21. The computer program product of claim 18, wherein the first computing resource comprises a reconfigurable logic device, and
the first computing resource is selected to execute the at least the portion of the first application by
determining that one or more attributes of the reconfigurable logic device satisfy a resource requirement for the at least the portion of the first application, and
determining that the reconfigurable logic device can be configured to execute the at least the portion of the first application according to the first workflow, prior to executing the at least the portion of the first application.

22. The computer program product of claim 18, wherein the first computing resource comprises a graphics processing unit (GPU), and
the first computing resource is selected to execute the at least the portion of the first application by
determining that one or more attributes of the GPU satisfy a resource requirement for the at least the portion of the first application, and
determining that the GPU can be configured to execute the at least the portion of the first application according to the first workflow, prior to executing the at least the portion of the first application.

* * * * *